US011320964B2

(12) United States Patent
Sato

(10) Patent No.: US 11,320,964 B2
(45) Date of Patent: *May 3, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Chihiro Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,718

(22) Filed: Sep. 22, 2020

(65) Prior Publication Data

US 2021/0271350 A1 Sep. 2, 2021

(30) Foreign Application Priority Data

Mar. 2, 2020 (JP) .............................. JP2020-035186

(51) Int. Cl.
*G06F 3/0482* (2013.01)

(52) U.S. Cl.
CPC .................................. *G06F 3/0482* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 6,462,762 B1* | 10/2002 | Ku | .......................... | G06F 16/168 715/853 |
| 7,437,676 B1* | 10/2008 | Magdum | ............... | H04L 41/024 715/735 |
| 7,650,349 B2* | 1/2010 | Yeh | .......................... | G06F 8/20 715/205 |
| 9,323,250 B2* | 4/2016 | Wang | .................... | B25J 11/009 |
| 2002/0032696 A1* | 3/2002 | Takiguchi | ............. | G06F 16/168 715/255 |
| 2006/0248474 A1* | 11/2006 | Kimotsuki | ............ | G06F 3/0482 715/810 |
| 2007/0150835 A1* | 6/2007 | Muller | .................. | G06F 3/0481 715/810 |
| 2007/0266340 A1* | 11/2007 | Cheng | ................... | G06F 3/0483 715/810 |
| 2008/0305815 A1* | 12/2008 | McDonough | ..... | H04M 3/42382 455/466 |
| 2010/0040366 A1* | 2/2010 | Jenkins | ............... | H04J 14/0267 398/34 |
| 2011/0289119 A1* | 11/2011 | Hu | ...................... | G06F 11/3006 707/803 |

(Continued)

FOREIGN PATENT DOCUMENTS

JP 2013080351 5/2013

*Primary Examiner* — Daniel Rodriguez
(74) *Attorney, Agent, or Firm* — JCIPRNET

(57) ABSTRACT

An information processing apparatus includes a memory storing specifications of components corresponding to functions forming a flow, and a processor configured to perform control to extract, using the specifications of the components and a first component selected by a user and serving as a base point, a second component that performs a process prior to or subsequent to the first component and perform control to display the first component and the second component on a display.

16 Claims, 26 Drawing Sheets

(56) References Cited

U.S. PATENT DOCUMENTS

| | | | |
|---|---|---|---|
| 2013/0083030 A1 | 4/2013 | Fukuda et al. | |
| 2014/0372956 A1* | 12/2014 | Bisca | G06F 16/93 |
| | | | 715/848 |
| 2015/0106708 A1* | 4/2015 | Monte | G06F 3/0482 |
| | | | 715/704 |
| 2016/0224569 A1* | 8/2016 | Cuddihy | G06F 16/22 |
| 2017/0046018 A1* | 2/2017 | Reichle | G06F 3/0481 |
| 2018/0173385 A1* | 6/2018 | Zhang | G06Q 10/0637 |
| 2019/0102078 A1* | 4/2019 | Bhatt | G06F 3/04847 |
| 2020/0012741 A1* | 1/2020 | Bracholdt | G06F 16/288 |
| 2020/0019550 A1* | 1/2020 | Keenan | G06F 16/2428 |
| 2020/0026397 A1* | 1/2020 | Wohlstadter | G16C 20/10 |
| 2020/0133472 A1* | 4/2020 | Fala | G06Q 50/163 |
| 2020/0379786 A1* | 12/2020 | Berg | G06F 3/04817 |

* cited by examiner

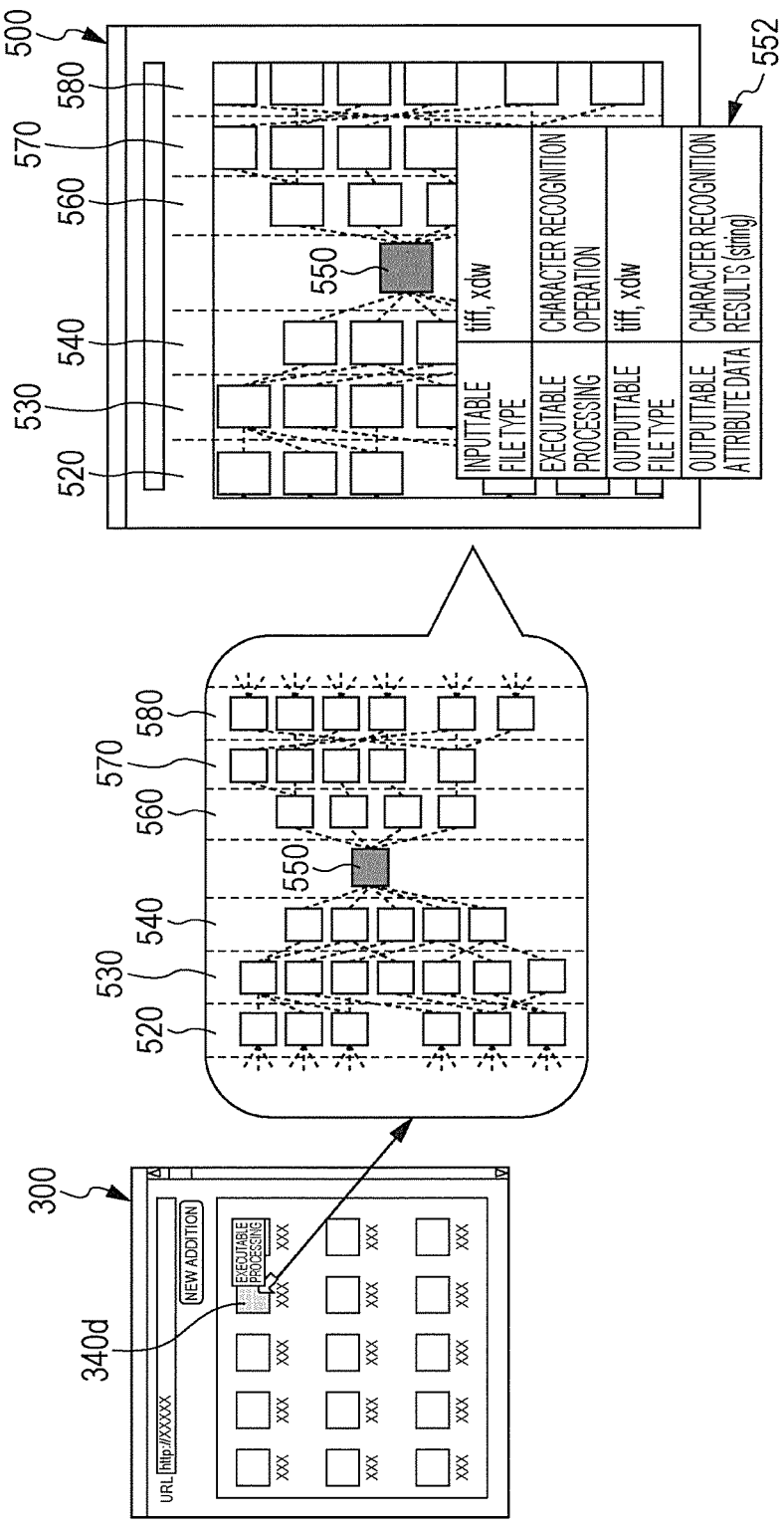

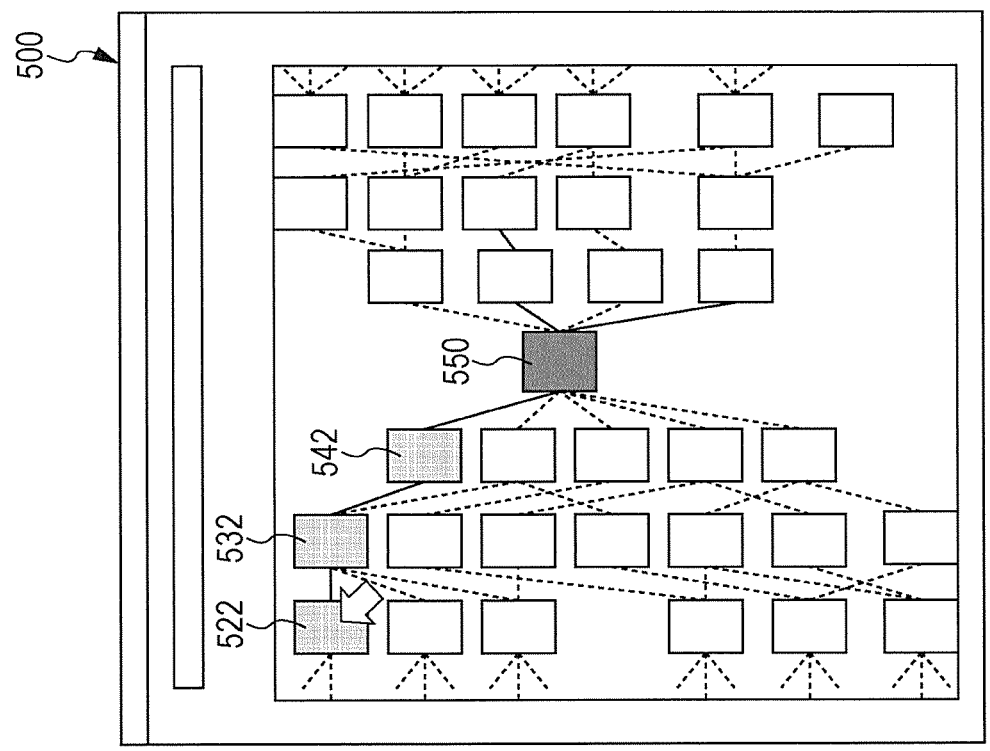
FIG. 6A1
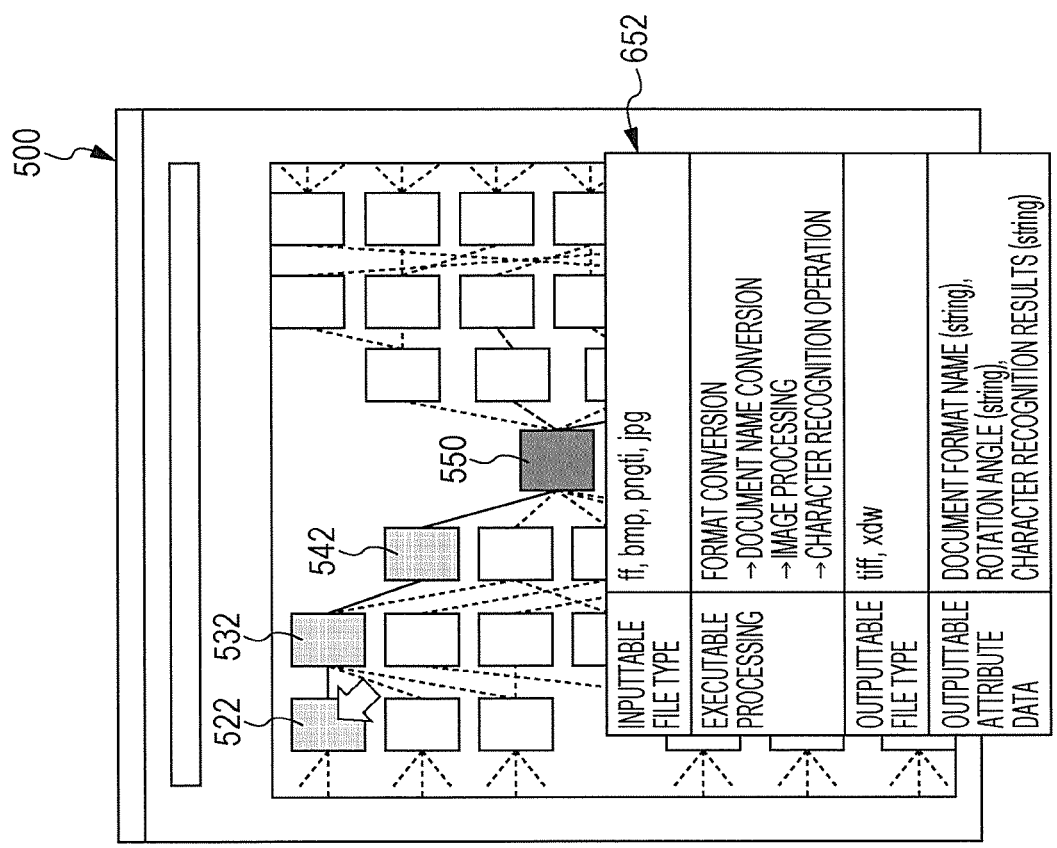
FIG. 6A2

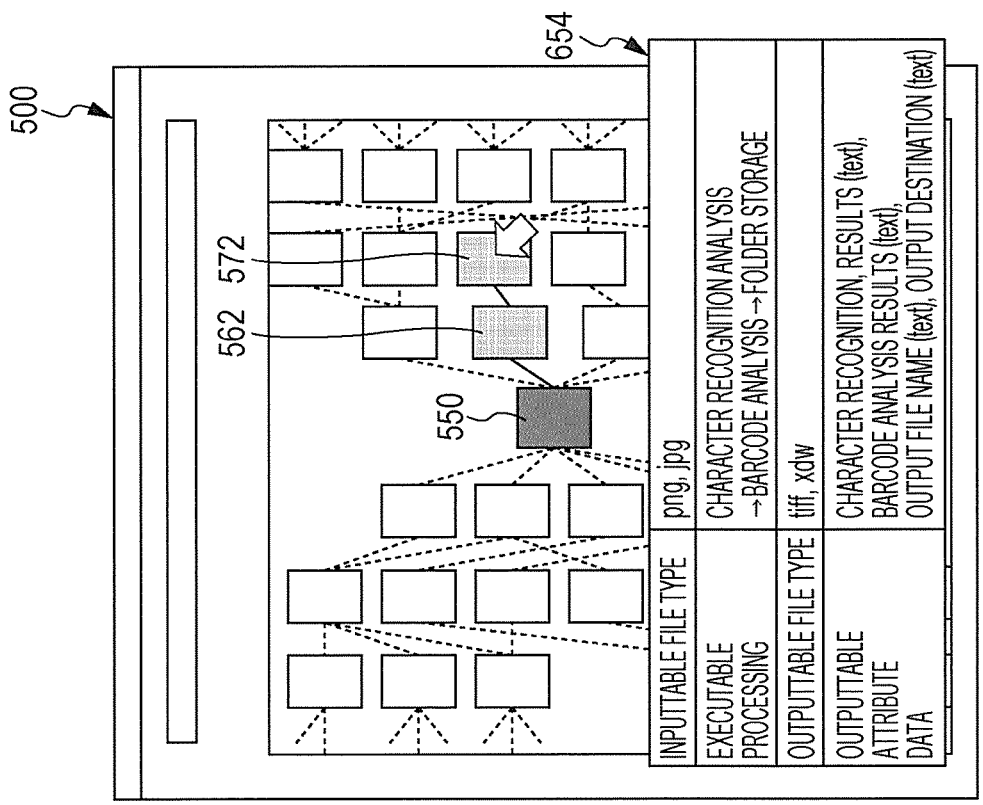
FIG. 6B2
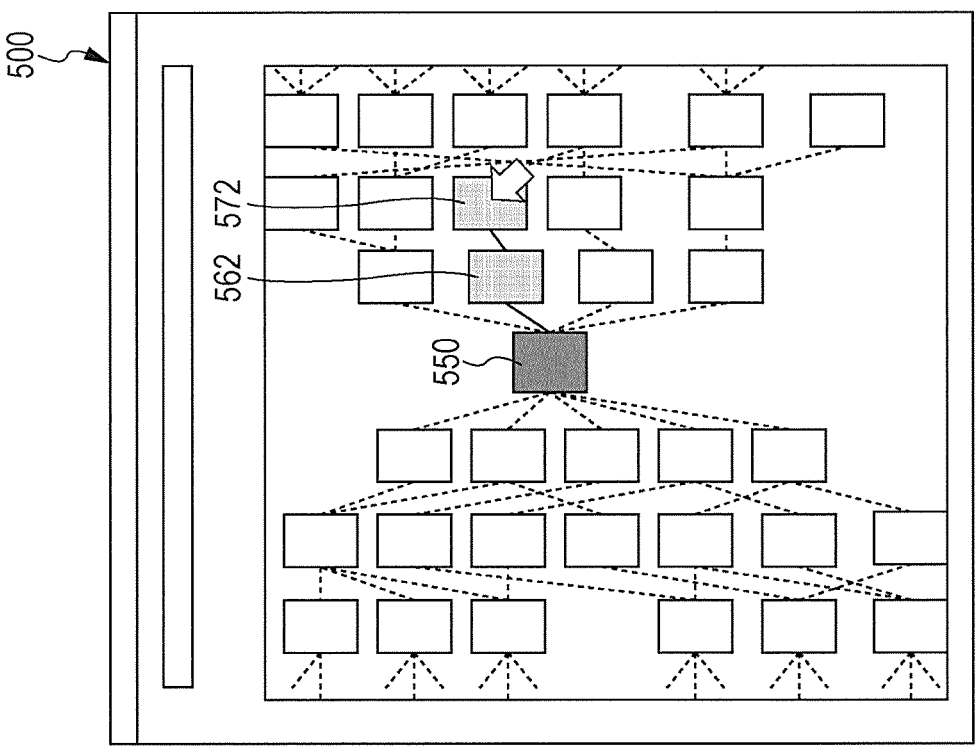
FIG. 6B1

FIG. 6C1
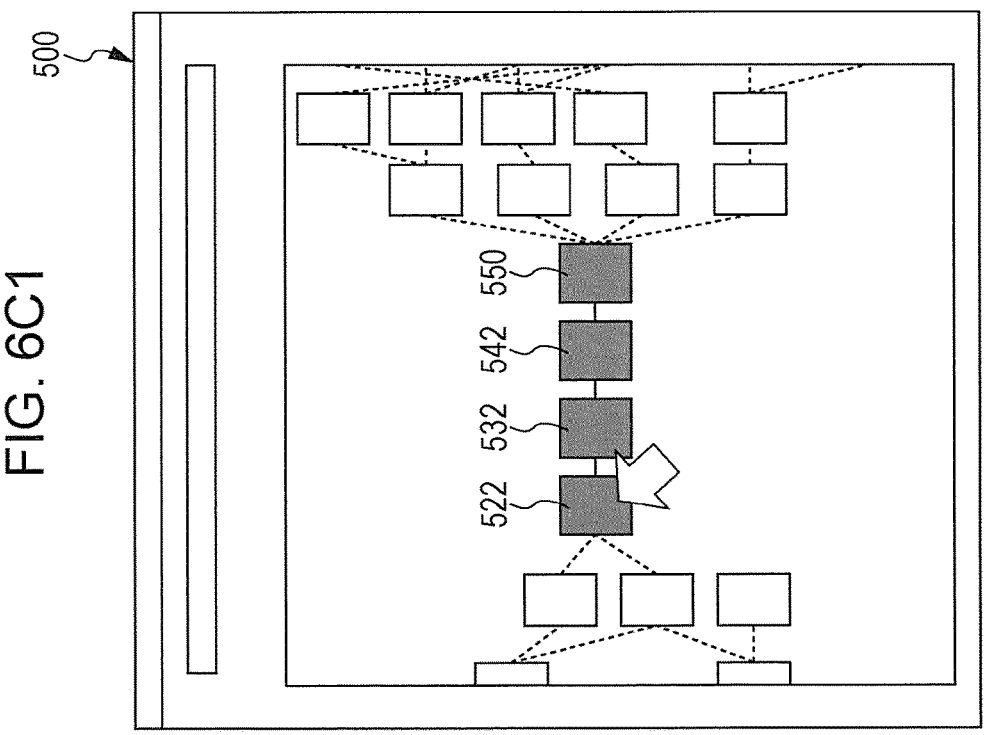
FIG. 6C2
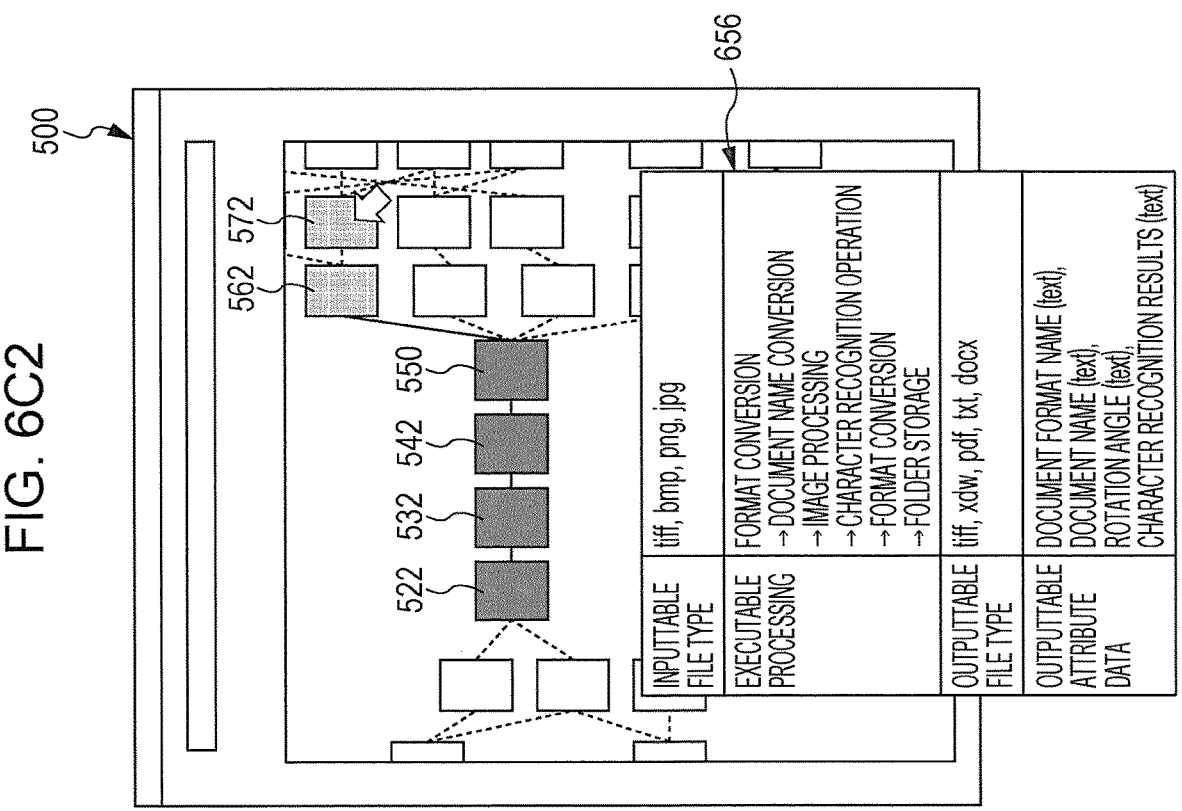

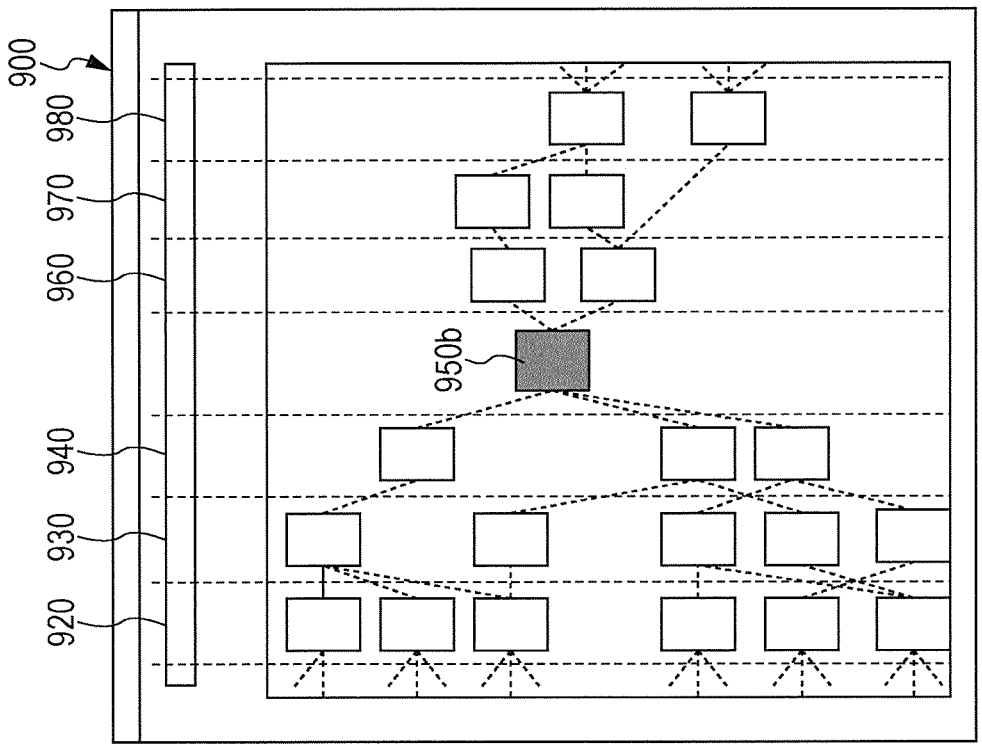
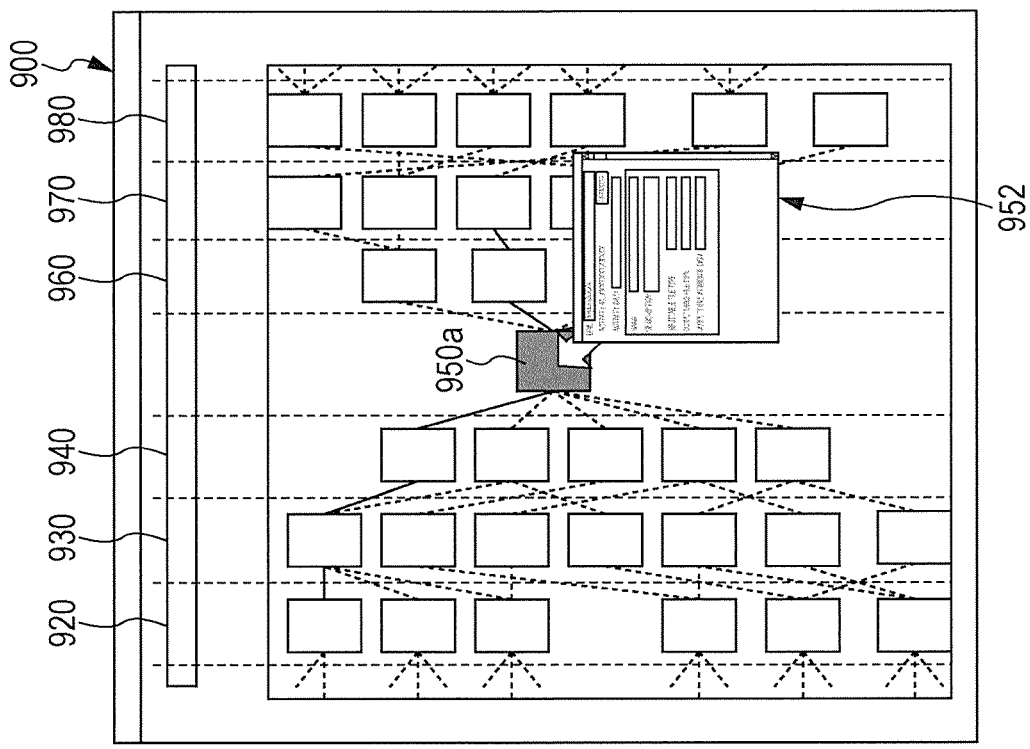

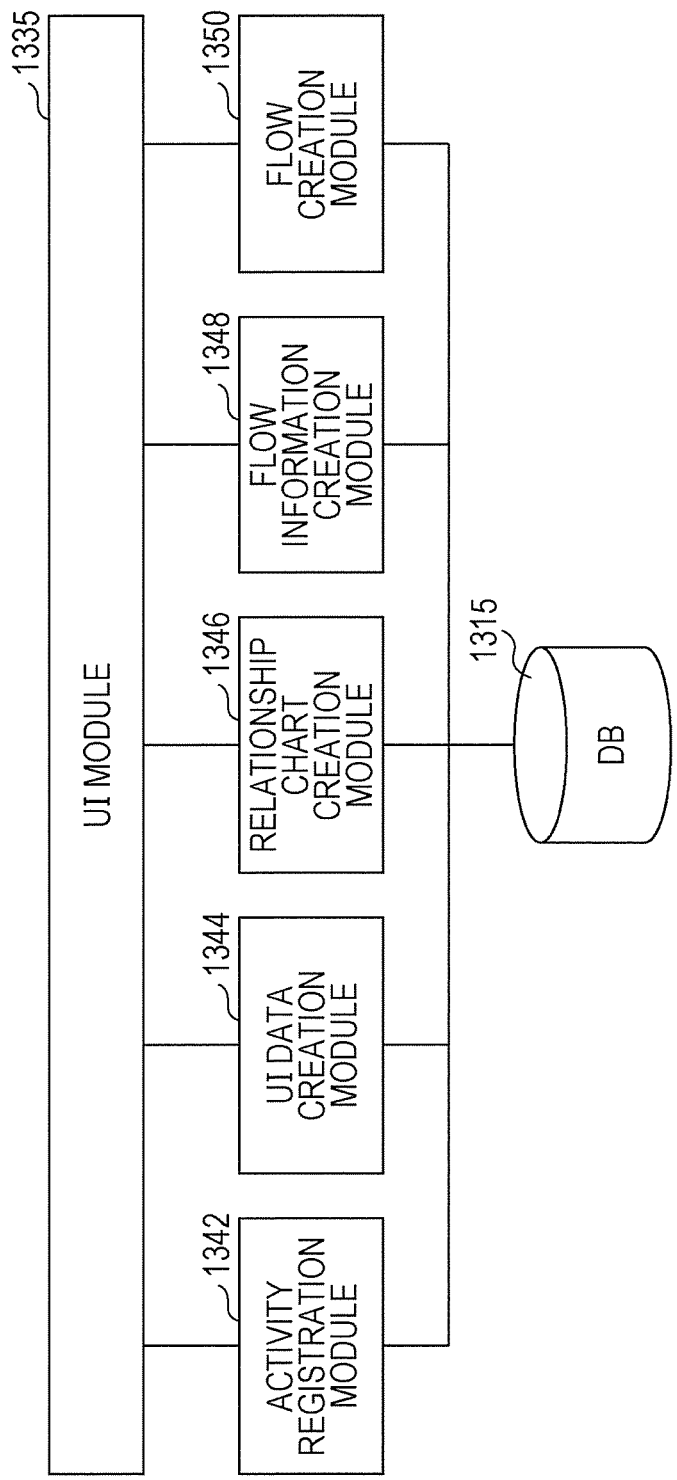

FIG. 15

| ACTIVITY ID 1505 | NAME 1510 | DESCRIPTION 1515 | INPUTTABLE FILE TYPE 1520 | OUTPUTTABLE FILE TYPE 1525 | OUTPUTTABLE ATTRIBUTE DATA 1530 | ACTIVITY DATA 1535 |
|---|---|---|---|---|---|---|
| GUID 1 | FORMAT CONVERSION | CONVERTING INPUT IMAGE TO SPECIFIED FORMAT AND OUTPUTTING CONVERTED IMAGE | tiff, jpeg, png | pdf, tiff, bmp, xdw | CONVERSION FORMAT: CHARACTER STRING RESOLUTION: NUMERICAL VALUE | ***** |
| GUID 2 | IMAGE PROCESSING | ROTATING INPUT IMAGE AND OUTPUTTING ROTATED IMAGE | tiff, bmp | tiff, bmp | N/A | ***** |
| GUID 3 | DOCUMENT NAME SETTING | CHANGING NAME OF INPUT IMAGE FILE TO SPECIFIED NAME | tiff, jpeg, bmp, png, pdf, xdw | tiff, jpeg, bmp, png, pdf, xdw | FILE NAME: CHARACTER STRING | ***** |
| GUID 4 | CHARACTER RECOGNITION OPERATION, QR CODE ANALYSIS | OUTPUTTING RESULTS OF CHARACTER RECOGNITION OF INPUT IMAGE AND RESULTS OF ANALYSIS OF QR CODE ON INPUT IMAGE | pdf, tiff, bmp | pdf, tiff, bmp | CHARACTER RECOGNITION RESULT: CHARACTER STRING QR CODE ANALYSIS RESULTS: CHARACTER STRING | ***** |
| GUID 5 | FOLDER OUTPUTTING | STORING IMAGE INTRODUCED INTO SPECIFIED FOLDER IN PREDETERMINED FOLDER | tiff, jpeg, bmp, png, pdf, xdw | N/A | FILE STORAGE DESTINATION: CHARACTER STRING | ***** |
| GUID 6 | CONFIDENTIAL BOX INPUTTING | STORING IMAGE RECEIVED IN CONFIDENTIAL BOX IN PREDETERMINED FOLDER | N/A | tiff, jpeg, bmp, png, pdf, xdw | DATE OF RECEPTION: DATE RECEIVED FILE NAME: CHARACTER STRING | ***** |
| GUID 7 | FAX INPUT | STORING FAX-RECEIVED IMAGE IN PREDETERMINED FOLDER | N/A | tiff | DATE OF TRANSMISSION: DATE TRANSMITTED FILE NAME: CHARACTER STRING | ***** |
| GUID 8 | ZIP COMPRESSION | COMPRESSING INPUT FILE IN PREDETERMINED FORMAT | NOT SPECIFIED | zip | FILE NAME: CHARACTER STRING | ***** |
| GUID 9 | MAIL TRANSMISSION | MAIL-TRANSMITTING INPUT IMAGE TO PREDETERMINED DESTINATION | NOT SPECIFIED | N/A | DESTINATION: CHARACTER STRING SENDER: CHARACTER STRING | ***** |
| ... | ... | ... | ... | ... | ... | ... |
| GUID N | GOOGLEDRIVE REGISTRATION | STORING INPUT IMAGE AT PREDETERMINED LOCATION ON GOOGLEDRIVE | NOT SPECIFIED | N/A | FILE NAME: CHARACTER STRING | ***** |

| ACTIVITY ID | NAME | DESCRIPTION | FLOW DATA |
|---|---|---|---|
| GUID X | FLOW 1 | FORMAT CONVERSION → DOCUMENT NAME CONVERSION → IMAGE PROCESSING → CHARACTER RECOGNITION OPERATION → ((FORMAT CONVERSION → FOLDER STORAGE), (ZIP COMPRESSION → → FOLDER STORAGE)) | GUID1, GUID3, GUID2, GUID4, ((GUID1, GUID5), (GUID7, GUID5)) |

FIG. 20

| ACTIVITY ID 2005 | NAME 2010 | DESCRIPTION 2015 | FLOW DATA 2020 | REGISTERED PERSON ID 2025 |
|---|---|---|---|---|
| GUID X1 | FLOW X1 | FORMAT CONVERSION→DOCUMENT NAME CONVERSION→IMAGE PROCESSING→CHARACTER RECOGNITION OPERATION→((FORMAT CONVERSION→FOLDER STORAGE), (ZIP COMPRESSION→FOLDER STORAGE)) | GUID1, GUID3, GUID2, GUID4, ((GUID1, GUID5), (GUID7, GUID5)) | AAA |
| GUID X2 | FLOW X2 | FORMAT CONVERSION→DOCUMENT NAME CONVERSION→IMAGE PROCESSING→CHARACTER RECOGNITION OPERATION→((FORMAT CONVERSION→FOLDER STORAGE), (ZIP COMPRESSION→FOLDER STORAGE)) | GUID1, GUID3, GUID2, GUID4, ((GUID1, GUID5), (GUID7, GUID5)) | BBB |
| ... | ... | ... | ... | ... |
| GUID XN | FLOW XN | FORMAT CONVERSION→DOCUMENT NAME CONVERSION→IMAGE PROCESSING→CHARACTER RECOGNITION OPERATION→((FORMAT CONVERSION→FOLDER STORAGE), (ZIP COMPRESSION→FOLDER STORAGE)) | GUID1, GUID3, GUID2, GUID4, ((GUID1, GUID5), (GUID7, GUID5)) | AAA |

| ACTIVITY ID | NAME | DESCRIPTION | TYPE | INPUTTABLE FILE TYPE | OUTPUTTABLE FILE TYPE | OUTPUTTABLE ATTRIBUTE DATA | ACTIVITY DATA |
|---|---|---|---|---|---|---|---|
| GUID 1 | FORMAT CONVERSION | CONVERTING INPUT IMAGE TO SPECIFIED FORMAT AND OUTPUTTING CONVERTED IMAGE | | tiff, jpeg, png | pdf, tiff, bmp, xdw | CONVERSION FORMAT: CHARACTER STRING RESOLUTION: NUMERICAL VALUE | ***** |
| GUID 2 | IMAGE PROCESSING | ROTATING INPUT IMAGE AND OUTPUTTING ROTATED IMAGE | | tiff, bmp | tiff, bmp | N/A | ***** |
| GUID 3 | DOCUMENT NAME SETTING | CHANGING NAME OF INPUT IMAGE FILE TO SPECIFIED NAME | | tiff, jpeg, bmp, png, pdf, xdw | tiff, jpeg, bmp, png, pdf, xdw | FILE NAME: CHARACTER STRING | ***** |
| GUID 4 | CHARACTER RECOGNITION OPERATION, QR CODE ANALYSIS | OUTPUTTING RESULTS OF CHARACTER RECOGNITION OF INPUT IMAGE AND RESULTS OF ANALYSIS OF QR CODE ON INPUT IMAGE | | pdf, tiff, bmp | pdf, tiff, bmp | CHARACTER RECOGNITION RESULT: CHARACTER STRING QR CODE ANALYSIS RESULTS: CHARACTER STRING | ***** |
| GUID 5 | FOLDER OUTPUTTING | STORING IMAGE INTRODUCED INTO SPECIFIED FOLDER IN PREDETERMINED FOLDER | OUTPUT | tiff, jpeg, bmp, png, pdf, xdw | N/A | FILE STORAGE DESTINATION: CHARACTER STRING | ***** |
| GUID 6 | CONFIDENTIAL BOX INPUTTING | STORING IMAGE RECEIVED IN CONFIDENTIAL BOX IN PREDETERMINED FOLDER | INPUT | N/A | tiff, jpeg, bmp, png, pdf, xdw | DATE OF RECEPTION: DATE RECEIVED FILE NAME: CHARACTER STRING | ***** |
| GUID 7 | FAX INPUT | STORING FAX-RECEIVED IMAGE IN PREDETERMINED FOLDER | INPUT | N/A | tiff | DATE OF TRANSMISSION: DATE TRANSMITTED FILE NAME: CHARACTER STRING | ***** |
| GUID 8 | ZIP COMPRESSION | COMPRESSING INPUT FILE IN PREDETERMINED FORMAT | OUTPUT | NOT SPECIFIED | zip | FILE NAME: CHARACTER STRING | ***** |
| GUID 9 | MAIL TRANSMISSION | MAIL-TRANSMITTING INPUT IMAGE TO PREDETERMINED DESTINATION | OUTPUT | NOT SPECIFIED | N/A | DESTINATION: CHARACTER STRING SENDER: CHARACTER STRING | ***** |
| ... | | ... | | | | ... | ... |
| GUID N | GOOGLEDRIVE REGISTRATION | STORING INPUT IMAGE AT PREDETERMINED LOCATION ON GOOGLEDRIVE | OUTPUT | NOT SPECIFIED | N/A | FILE NAME: CHARACTER STRING | ***** |

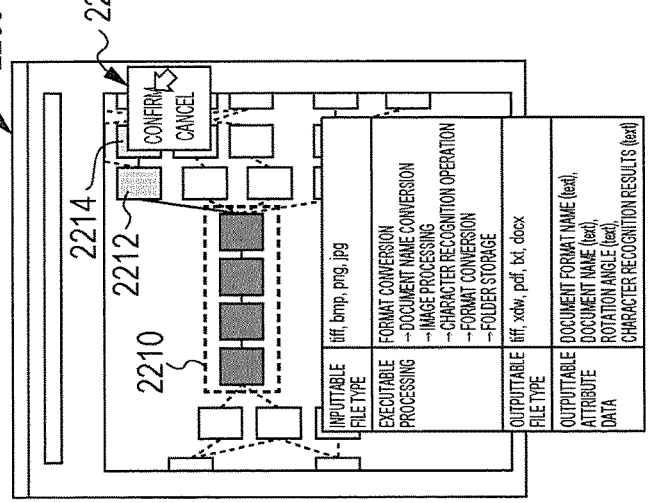
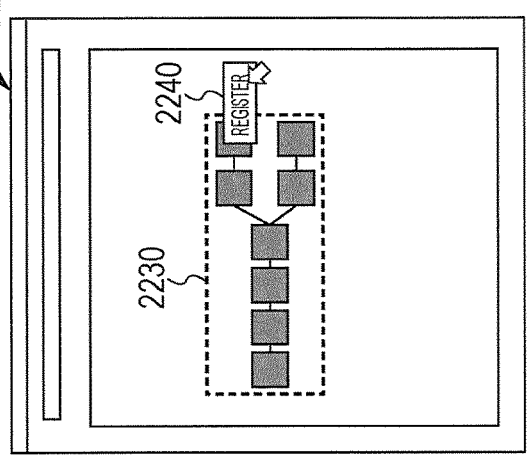
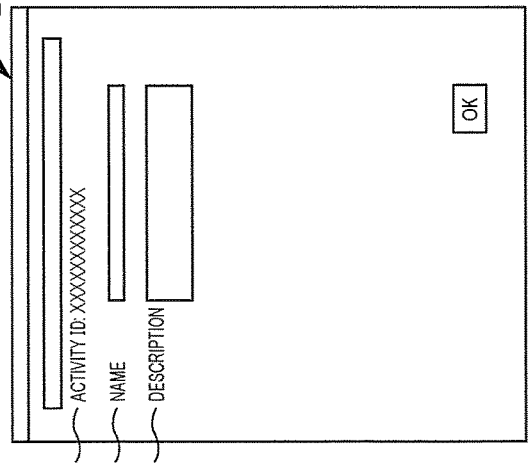
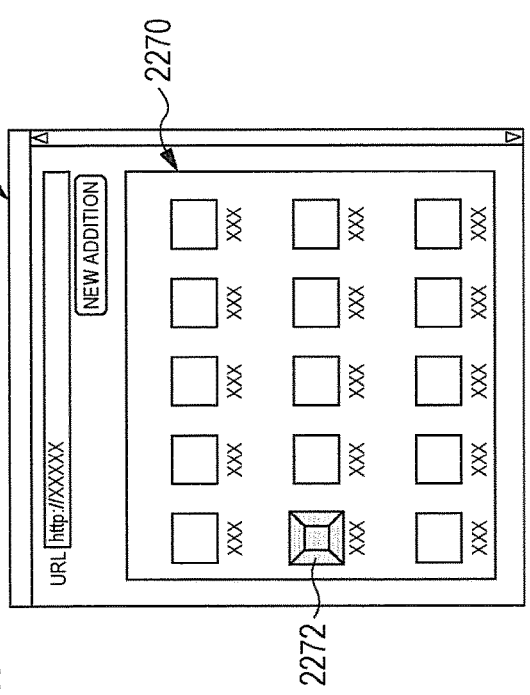

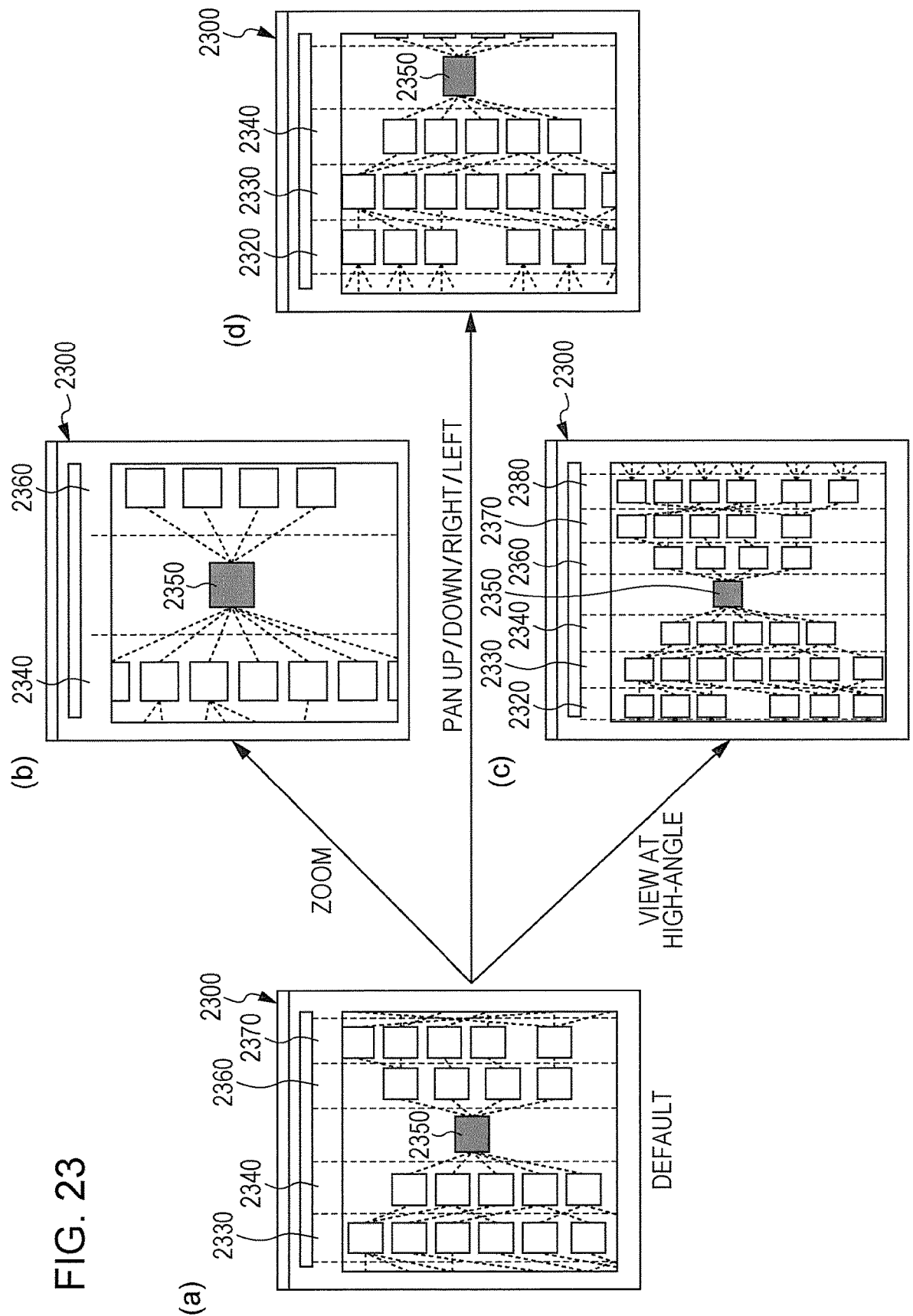

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-035186 filed Mar. 2, 2020.

BACKGROUND

(i) Technical Field

The present disclosure relates to an information processing apparatus and a non-transitory computer readable medium.

(ii) Related Art

Japanese Unexamined Patent Application Publication No. 2013-080351 discloses a technique of displaying display component candidates responsive to characteristics of a workflow. According to the disclosed technique, if a display instruction to display a first component indicating contents of a process belonging to a first process type is received, the first component is displayed on a display. A second component indicating contents of a process belonging to a second process type that has a determined sequential order relationship with the first process type is displayed on the display in association with the first component in accordance with the sequential order relationship.

A user may create a flow by combining components responsive to functions forming the flow. In this case, the user may create the flow after determining beforehand all components forming the flow.

SUMMARY

Aspects of non-limiting embodiments of the present disclosure relate to providing an information processing apparatus and non-transitory computer readable medium for creating, when a user creates a flow by combining components responsive to functions forming the flow, the flow by selecting part of components forming the flow rather than determining all the components forming the flow in advance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory storing specifications of components corresponding to functions forming a flow, and a processor configured to perform control to extract, using the specifications of the components and a first component selected by a user and serving as a base point, a second component that performs a process prior to or subsequent to the first component and perform control to display the first component and the second component on a display.

BRIEF DESCRIPTION OF THE DRAWINGS

Exemplary embodiment of the present disclosure will be described in detail based on the following figures, wherein:

FIGS. 5A through 5C illustrate a process example of the exemplary embodiment;

FIGS. 6A1 and 6A2 illustrate a process example of the exemplary embodiment;

FIGS. 6B1 and 6B2 illustrate a process example of the exemplary embodiment;

FIGS. 6C1 and 6C2 illustrate a process example of the exemplary embodiment;

FIGS. 9A and 9B illustrate a process example of the exemplary embodiment;

FIG. 13 illustrates a conceptual modular configuration as a specific example of the exemplary embodiment;

FIG. 15 illustrates a data structure of an activity registration information table;

FIG. 16 illustrates a data structure of a flow registration information table;

FIG. 20 illustrates a data structure of a flow registration information table;

FIG. 21 illustrates a data structure of an activity registration information table;

FIGS. 22A through 22C illustrate a process example of the exemplary embodiment;

FIG. 23 consists of FIGS. 23(a) through 23(d) illustrating a process example of the exemplary embodiment.

DETAILED DESCRIPTION

Exemplary embodiment of the disclosure is described with reference to the drawings.

Figure 1:
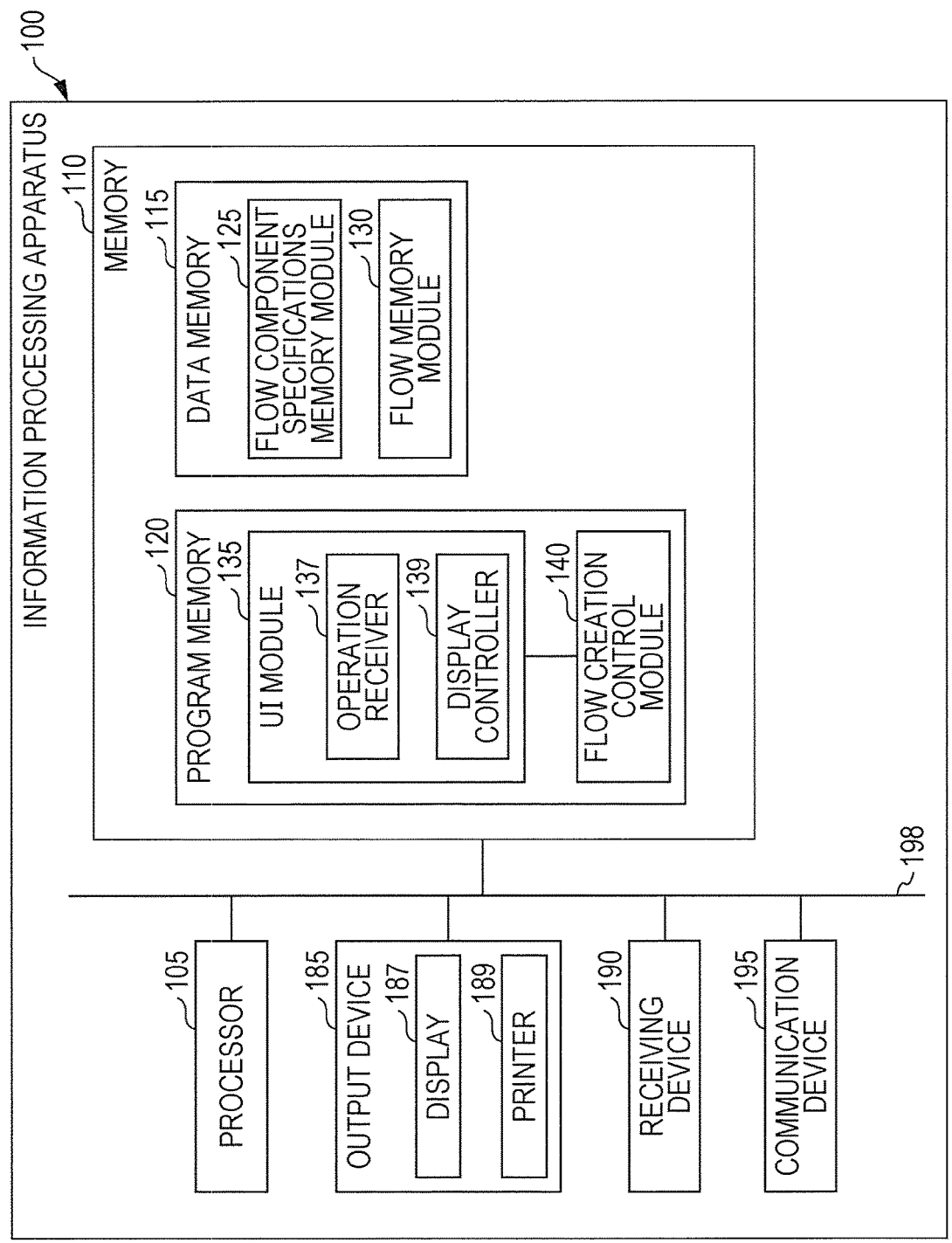
FIG. 1 illustrates a conceptual modular configuration of an exemplary embodiment.

FIG. 1 illustrates a conceptual modular configuration of the exemplary embodiment. The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of a system, method, and computer programs for causing the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information". The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to mean that it is determined whether something is A, and that if something is determined as A, an action B is to be taken. The statement becomes meaningless if the determination as to whether something is A is not performed. If a discussion is made of events "A, B, and C", the discussion is applicable to at least one of the events "A, B, and C" unless otherwise noted. For example, the discussion is applicable to the case in which only the event A is selected.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment performs a flow creation process. Referring to FIG. 1, the information processing apparatus 100 includes at least a processor 105 and memory 110 and further includes a bus 198 through which data is exchanged therebetween. The information processing apparatus 100 may further include an output device 185, receiving device 190, and communication device 195. Data is exchanged via the bus 198 among the processor 105, memory 110, output device 185, receiving device 190, and communication device 195.

The block diagram in FIG. 1 also illustrates a hardware configuration of a computer that implements the exemplary embodiment. The computer hardware executing a program of the exemplary embodiment is a computer illustrated in FIG. 1 and is typically a computer, such as a personal computer or server. Specifically, the information processing apparatus 100 employs the processor 105 and the memory 110 as a storage device.

One or more processors 105 may be employed. The processor 105 may include a central processing unit (CPU) or a microprocessor. If multiple processors 105 are employed, they may be a tightly or loosely coupled multiprocessor. For example, a single processor 105 may include multiple processor cores. Alternatively, a system including multiple computers linked via a communication network and functioning like a virtual single computer may be employed. The system may be a loosely coupled multiprocessor that is constructed as a cluster system or a computer cluster. The processor 105 executes a program on the program memory 120.

The memory 110 may include a semiconductor memory, such as a register or a cache memory in the processor 105 or a memory, such as a random-access memory (RAM) or a read-only memory (ROM). The memory 110 may also be an internal memory device, such hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, memory card or other external storage device or other auxiliary memory device. The memory 110 may also be a memory device of a server connected to the information processing apparatus 100 via a communication network.

The memory 110 includes a data memory 115 storing data and a program memory 120 storing programs. The data memory 115 may store programs of the modules illustrated in FIG. 1, programs such as an operating system to start up the computer, and data, such as parameters that appropriately vary in the execution of the modules.

The output device 185 includes a display 187 and printer 189. The display 187 may be a liquid-crystal display, organic electroluminescent (EL) display, or three-dimensional display and displays, in text or image, process results from the processor 105 and data on the data memory 115. The printer 189 may be a printer or a multi-function device and prints the process results from the processor 105 and data on the data memory 115. The output device 185 may also include a speaker and actuator to vibrate the device.

The receiving device 190 receives data that is responsive to user operation performed on a keyboard, mouse, microphone, camera (including eye-gaze detection camera) or other devices. The receiving device 190 also receives image data that is created by a scanner in the scanning operation thereof.

A touch screen serving the functions of both the display 187 and the receiving device 190 may be used. In such a case, without the physical presence of keys, the keyboard function may be implemented by drawing a keyboard (called a software keyboard or a screen keyboard) on the touch screen using software.

The display 187 and receiving device 190 are used as a user interface.

The communication device 195 is a communication network interface, such as a network card, used to connect to another apparatus via a communication network.

The exemplary embodiment related to computer program is implemented when the computer program as a software resource is read onto the program memory 120 as a hardware resource and the software and hardware resources cooperate with each other.

The hardware configuration in FIG. 1 is illustrated for exemplary purposes only. The exemplary embodiment is not limited to the configuration illustrated in FIG. 1 and is acceptable as long as the configuration implements the modules of the exemplary embodiment. For example, the processor 105 may include a graphics processing unit (GPU) (including general-purpose computing on graphics processing unit (GPGPU)). The processor 105 may be a dedicated hardware resource (such as application specific integrated circuit (ASIC) that executes part of the modules or field-programmable gate array (FPGA) that is reconfigurable integrated circuit. Part of the modules may be in an external system that is connected to the information processing apparatus 100 via a communication network. Multiple of the system in FIG. 1 may be operatively coupled via a communication network. The system in FIG. 1 may be incorporated in a personal computer, portable information communication apparatus (such as cellular phone, smart phone, mobile device, wearable computer), information appliance, robot, copier, fax, scanner, printer, or multi-function apparatus (image processing apparatus having at least two functions of scanner, printer, copier, and fax).

The processor 105 is connected to the memory 110, output device 185, receiving device 190, and communication device 195 via the bus 198. The processor 105 executes a process in accordance with the computer program that describes an execution sequence of each module and stored on the program memory 120. For example, when the receiving device 190 receives a user operation, the processor 105 performs the process of a module on the program memory 120 corresponding to the user operation, causes the data memory 115 to store the process results, outputs the process results to the display 187, or transmits the process results to another apparatus via the communication device 195.

The memory 110 includes the data memory 115 and program memory 120 and is connected to the processor 105, output device 185, receiving device 190, and communication device 195 via the bus 198.

The data memory 115 stores a flow component specifications memory module 125 and flow memory module 130.

The flow component specifications memory module 125 stores the specifications of a component corresponding to a function forming a flow.

The "component" herein forms the flow and is a process unit that performs an independent process. The component is also referred to as a process component, function, activity, plugin, or connector. In the following discussion, for example, the component is an activity. If components as process units are connected to form a flow and data, such as a document, is applied to the flow, the process is performed in accordance with the flow.

The "flow" is defined as a sequential order of combined components. In accordance with the flow, the process of the component is performed and the process results are obtained. The data input in accordance with the flow (definition) is thus processed.

The "specifications of the component" include at least process contents of the component and information used to connect one component to another. The specifications of the component may include (1) a file type that is processed by the component, (2) process contents of the component, (3) a file type outputtable by the component, and (4) attribute information outputtable by the component. The specifications of the component may further include (5) parameter inputtable by the component.

The flow memory module 130 stores information on a created flow and information on a flow currently being created.

The user interface (UI) module 135 includes an operation receiver 137 and display controller 139 and is connected to a flow creation control module 140. The UI module 135 performs a process related to user interface.

The operation receiver 137 receives a user operation detected by the receiving device 190. In accordance with the user operation, the processor 105 causes the display controller 139 or the flow creation control module 140 to perform the process corresponding thereto.

Using the specifications of the component stored on the flow component specifications memory module 125, the display controller 139 performs control to extract, using a first component serving as a base component and selected by a user, a second component that performs a process prior to or subsequent to the first component, and to display the first component and second component on the display 187.

The "base point" is a component that the user has first selected to create a flow. For example, the base point may be a component that performs a major process of the flow or a component that the user may desire to introduce into the flow.

The display form to "display the first component and the second component on the display 187" is that the second component as a component prior to or subsequent to the first component serving as the base point in the flow is displayed in a different way from the first component. For example, the first component and the second component are displayed side by side on the display 187 or displayed in a connected state. In the first case, if the direction of the flow is defined as being from left to right, the left side is front (forward) and the right side is back (backward). If the second component is ahead of the first component, the second component may be displayed to the left of the first component. If the second component is behind the first component, the second component may be displayed to the right of the first component. The direction of the flow may be defined as being from up to down. In such a case, the upper side is forward and the lower side is backward in the flow. If the second component is ahead of the first component, the second component may be displayed above the first component. If the second component is behind the first component, the second component may be displayed below the first component. In the second case, the components may be connected with line. The line in this case indicates the path of the flow. The path is also referred to as a route. If the line is headed with an arrow, the component indicated by the arrow may be behind in the flow. In this case, the relationship of the first and second components is not defined by positions thereof. For example, if the second component is ahead of the first component, the arrow-headed line simply connects the first and second components in a manner such that the arrow points to the first component. If the second component is behind the first component, the arrow-headed line simply connects the first and second components in a manner such that the arrow points to the second component. In the following discussion of the display example of the flow, the left side is forward and the right side is backward in the flow and the components are connected with the line. This display example is described for exemplary purposes only. Any display example may be acceptable as long as the direction of the flow is distinctively indicated. The display example is described with reference to FIGS. 5A through 5C.

The display controller 139 performs control to extract a third component performing a process prior to the second component after extracting the second component performing the process prior to the first component and to display the second and third components on the display 187.

After extracting the third component performing the process prior to the second component, the display controller 139 performs control to further extract a fourth component performing a process prior to the third component and to display the fourth component connected to the third component on the display 187. This routine may continue until an extracted component is an input source.

Alternatively, after extracting the second component performing the process subsequent to the first component, the display controller 139 performs control to extract the third component performing the process subsequent to the second component and to display the second and third components on the display 187.

After extracting the third component performing the process subsequent to the second component, the display controller 139 performs control to extract the fourth component performing the process subsequent to the third component and to display the fourth and third components in a connected state on the display 187. This routine may continue until an extracted component is an output destination.

The second and third components may be displayed in a connected state on the display 187. This process may be described with reference to FIGS. 5A through 5C.

If a component other than the first component serving as the base point is selected, the display controller 139 performs control to extract a path from the selected component to the first component and display the path on the display 187. This process may be described with reference to FIGS. 6A and 6B.

If the path is selected, the display controller 139 may perform control to delete from the display 187 a component at the same layer as a component on the path.

By deleting a component at the same layer as a component on the path, components other than those on the path are deleted. The path from the selected component to the first component is distinctly displayed. This process is described with reference to FIGS. 6C1 and 6C2.

The "layer" refers to a component group having the same number of components that is counted starting with the first component serving as the base point. For example, a component group performing a process immediately prior to the first component belongs to the same layer and a component group performing a process prior to the first component by two processes belongs to the same layer. The component groups are similarly layered. Concerning components performing processes subsequent to the first component, the component group performing a process immediately subsequent to the first component belongs to the same layer and the component group performing a process subsequent to the first component by two processes belongs to the same layer. The component groups are similarly layered.

If multiple paths are present, the display controller 139 may perform control to display a list of the paths on the display 187 from which a path can be selected.

If a path is selected, the display controller 139 may perform control to display information on the path on the display 187. Such a process is described with reference to FIGS. 7A and 7B.

The display controller 139 may perform control to set the selected path to be selectable as a component and display the path in a form different from the component on the display 187. Specifically, although the path including multiple components is processed in the same way as a component, the component as the path is set to be different in a display form from an ordinary component such that the user understands that the component is the path. For example, if an ordinary component has a simple rectangular shape, the component as the path may be patterned as a three-dimensionally looking push button, differently colored, tagged with characters, dynamically changed (with flashing or animation), blinked (in a manner such that an object may be simply blinking, a blinking period of the object may be varied, or a blinking interval may be changed) or changed in the combination thereof. This process is described with reference to FIGS. 8A and 8B.

If information on the specifications of the component displayed on the display 187 has been modified, the display controller 139 may perform control to re-extract a component connected to the component displayed on the display 187 and display the re-extracted component on the display 187.

The "information on the specifications of the component" is information that is capable of modifying the connection between the components. For example, from among the specifications of the component described previously, (1) the file type processable by the component, (3) the file type outputtable by the component, (4) the attribute information outputtable by the component, and (5) parameter inputtable by the component correspond to the "information on the specifications of the component".

The description that "information on the specifications of the component has been modified" corresponds to the case in which the information has been modified in response to the user operation. For example, if original specifications support multiple file types, the modification may be fixed to any of the file types or may be modifying parameters. This process may be described below with reference to FIGS. 9A and 9B.

The display controller 139 may perform control to display a component other than the first component serving as the base point on the display 187 such that the component is displayed closer to the first component as the component has a higher frequency of (past) uses.

For example, if the first component is displayed at the center of a screen, a component having a higher frequency of uses is displayed closer to the center of the screen.

The frequency of uses may be a first frequency of uses in a flow created in the past by the user or a second frequency of uses in all the flows created in the past.

In such a case, the display controller 139 may perform control to display the first and second frequency of uses separately one from the other on the display 187.

The "first frequency of uses" is based on the flow created by the user in the past and the "second frequency of uses" is based on the flows created in the past by not only the user but other users. This process is described with reference to FIG. 10.

If components are equal in the second frequency of uses, the display controller 139 may perform control to display a component on the display 187 such that the component having a larger first frequency of uses is displayed in a larger size. In this case, components serving as comparison targets may be the ones at the same layer. Specifically, if components belonging to the same layer are equal in the second frequency of uses, the display controller 139 may perform control to display the components such that a component having a larger first frequency of uses is displayed in a larger display size on the display 187.

The display controller 139 may perform control to display in a smaller size a component at a n-th layer, counted from the first component serving as the base point, on the display 187 than a component at an (n−1)-th layer. If the first component serving as the base point is set to be a 0th layer, the layer including the second component is a first layer, and the layer including the third component is a second layer. In this case, the third component is smaller in size than the second component. With a deeper layer (as the distance from the first component serving as the base point increases), the component at the layer is reduced in display size. The rule of a component at a deeper layer having a smaller display size may be applied to a component having a smaller value in the first frequency of uses, in the second frequency of uses, or in a total of the first and second frequencies of past uses. The smaller value may be determined with reference to a predetermined frequency of uses. If the components are sorted in level from higher to lower frequency of uses (descending order), a value below a predetermined level or below may be determined to be the smaller value. If the components are sorted in level from lower to higher frequency of uses (ascending order), a predetermined level or above may be determined to be the smaller value.

If the first component serving as the base point is an input source, the display controller 139 may perform control to extract the second component performing the process subsequent to the first component and display the first and second components on the display 187. This is the operation performed when the base point is a head of the flow.

If the first component serving as the base point is an output destination, the display controller 139 may perform control to extract the second component performing the process prior to the first component and display the first and second components on the display 187. This process is performed when the base point is the end of the flow.

If the first component serving as the base point is neither the input source nor the output destination, the display controller 139 may perform control to extract the second component performing the process prior to and the process subsequent to the first component and display the second and first components on the display 187. This is the process performed when the base point is neither the head of the flow nor the tail of the flow. In other words, this is the process performed when the base point is in the middle of the flow. These processes are described with reference to FIGS. 12A through 12C.

The flow creation control module 140 is connected to the UI module 135. The flow creation control module 140 performs the process related to the creation of the flow. The flow creation control module 140 performs the process to cause the display controller 139 to perform the display control described above.

Figure 2A:
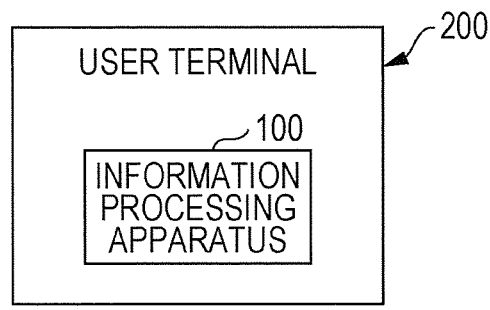
FIGS. 2A and 2B illustrate a system configuration of the exemplary embodiment.
Figure 2B:
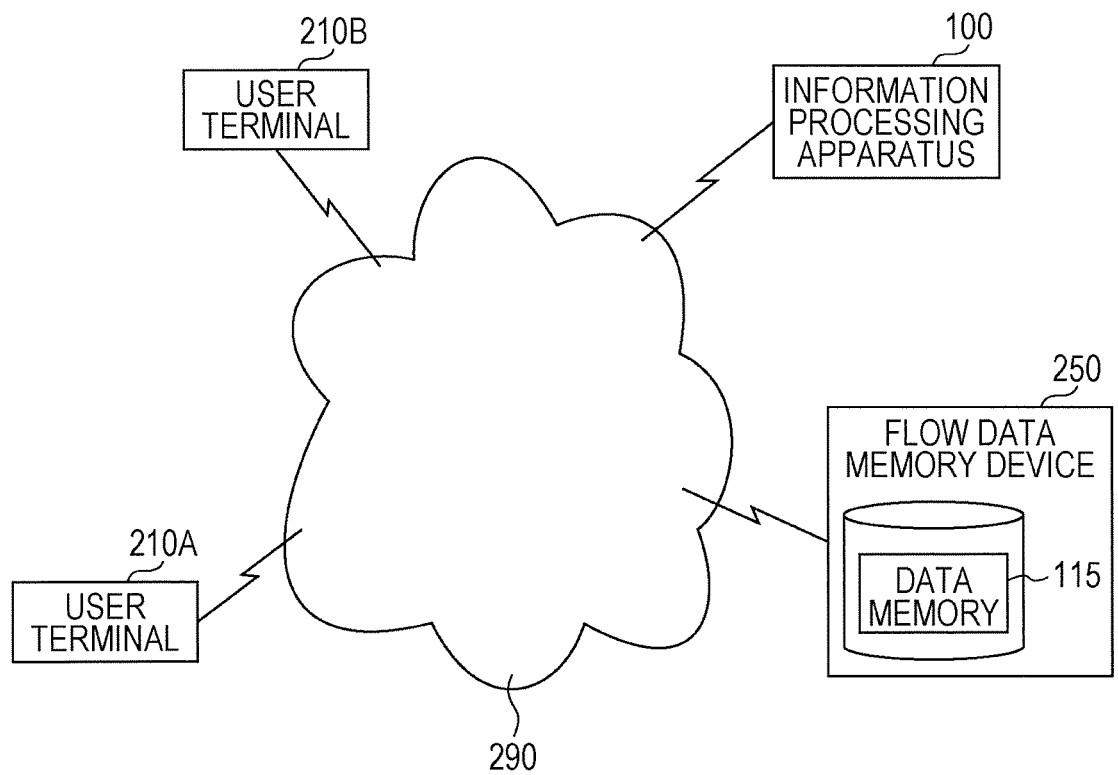

FIGS. 2A and 2B illustrate a system configuration of the exemplary embodiment. FIG. 2A illustrates a standalone system configuration. A user terminal 200 includes the information processing apparatus 100. The user creates a flow using the information processing apparatus 100. The flow component specifications memory module 125 in the information processing apparatus 100 stores not only the frequency of uses of each component by the user but also the frequency of uses of each component in flows created in the past and used by another user. Using the communication function of the user terminal 200, the frequency of uses by another user may be received from another information processing apparatus.

FIG. 2B illustrates a network system configuration. The information processing apparatus 100, user terminal 210A, user terminal 210B, and flow data memory device 250 are interconnected to each other via a communication network 290. The flow data memory device 250 includes the data memory 115. The communication network 290 may be a wireless network, a wired network, or a combination thereof. The communication network 290 may be the Internet or intranet as a communication infrastructure. The function of the information processing apparatus 100 may be implemented by a cloud service.

Using a user terminal 210, the user accesses the information processing apparatus 100 and creates a flow. Multiple information processing apparatuses 100 may be connected to the communication network 290. In such a case, the information processing apparatus 100 may use the data memory 115 in the flow data memory device 250. In this way, the user may use information on the flow created in another information processing apparatus 100.

The information processing apparatus 100 is a flow management system. The information processing apparatus 100 defines a flow that is made by combining independent components, called activities, and performs a process on a document input to the flow management system in accordance with the defined flow.

The activities are listed as follows:

Confidential box input activity: "Acquiring in Jpeg" is set beforehand in an activity setting user interface.

Format conversion activity: "Converting Jpeg into Tiff" is set beforehand in the activity setting user interface.

QR code (registered trademark) analysis activity: "Analyzing QR code on first page and transferring analysis results and parameters to subsequent stage such that the analysis result are used in subsequent plugin" is set beforehand in the activity setting user interface.

Document name setting activity: "setting QR code analysis results in file name" is set in the activity setting user interface.

Folder storage activity: "Storing file in specified shared folder" is set beforehand in the activity setting user interface.

A flow may now be created such that the activity group is executed from top to bottom. A document scanned by a scanner is captured in the flow management system as a Jpeg image at the confidential box input activity and converted from Jpeg to Tiff by the format conversion activity. QR code on Tiff is read by the QR code analysis activity. A character string included in the QR code extracted. The character string resulting from the QR code is set in a document name (file name) and stored in a predetermined folder by the folder storage activity. By executing the flow, a series of these operations is automatically performed.

An example of the flow management system is a service of automating a web service as an example of the activity by operatively coupling the web service. This service provides a mechanism in which a process based on the flow is automatically performed. In the mechanism, a flow to combine and process in combination an activity (a variety of independent web services) and a template (a web service that is produced beforehand by concatenating multiple services) may be defined beforehand. The process based on the flow is automatically performed in response to the generation of a trigger.

In available systems, the user may thus define a desirable flow by combining independent activities and feed data to the flow. A series of processes are thus automatically performed and results are obtained.

When the flow is created, the following three settings may be included in the flow:

"input source" receiving data,

"processing" to perform a certain process on the received data, and

"output destination" to which the processed data is output.

If the purpose of using the flow is distinct or the combination of functions to create the flow are determined (in other words, the flow design is complete) in the creation of the flow, the flow may be relatively easily created. Part of the purpose may be sometimes undecided. For example, the user may desire to perform a given process on data to obtain process results but where the data is to be captured (input source) and where the results are output (output destination) may be undecided. For example, although the input source (output destination) may be decided, the output destination (input source) may be undecided. Although the input source and the output destination are decided, an effective process is to be performed between therebetween. In such cases, the creation of the flow is difficult.

In the above-described actual service that causes the web services to be operatively coupled, the number of activities registered in the system is 100 at least and 400 at most.

The user designs beforehand how to define a flow in view of the purpose thereof by considering the combination of activities selected from a large number of activities while also studying and verifying each activity.

When the flow is organized in the system, the user creates the flow by combining the functions one by one to determine whether what the user desires is satisfied or not.

A desired function may be found through searching. However, finding the desired function from the search results is typically difficult. Even if the desired function is found in the search results, what prior or subsequent function to connect to the desired function in the flow may be performed by actually creating the flow.

It is contemplated that a prepared template is used. In that case, however, the function of the template is to be studied in advance.

The flow creation through wizard may be only performed with the knowledge of a desired flow.

When the user creates a flow by combining components corresponding to the functions forming the flow, all the components are determined before creating the flow. It is however difficult for the user to understand the specifications of all the components and this serves as a barrier in the flow creation.

In the configuration where the user creates the flow by combining components corresponding to the functions forming the flow, the user is to understand the specifications of all the components. In comparison with the configuration, the exemplary embodiment may lower the barrier in the flow creation. Specifically, even if only part of the process of the flow is determined, the flow is designed to be created, leading to lowering the barrier. The introduction of the flow management system may be easier.

Specific process example of the exemplary embodiment is described below. If the user specifies one activity first, an activity connectable to that activity is displayed in a relationship chart. The relationship chart is displayed in multiple layers. If one of the activities on the relationship chart is selected, a partial flow reaching the first specified activity, at least one of the following items is displayed in a list:

inputtable file type, process contents executable in the partial flow, and outputtable file format and attribute data.

The user determines the partial flow while referring to the list and thus creates the flow.

Figure 3:
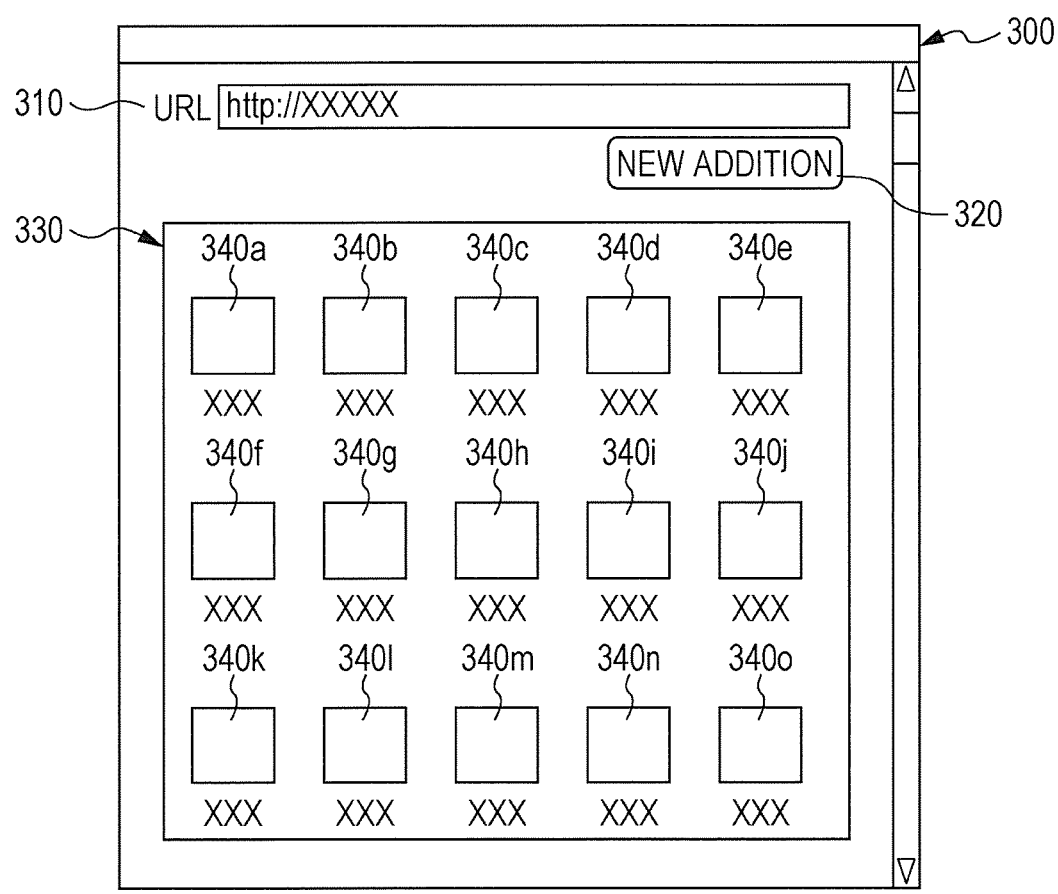
FIG. 3 illustrates a display example of an activity list screen.

FIG. 3 illustrates a display example of an activity list screen 300. The display controller 139 displays in a list activities registered on the flow component specifications memory module 125. For example, the activity list screen 300 displays an activity registration position specifying column 310, new addition button 320, activity list region 330. The activity list region 330 displays multiple activities 340 (activity 340a through activity 340o). Displayed below the activities 340 of the activity list region 330 are names registered on an activity attribute registration screen 400 in FIG. 4.

To newly register an activity on the information processing apparatus 100, the user selects the new addition button 320. If the selection of the new addition button 320 is detected, the activity attribute registration screen 400 in FIG. 4 is displayed.

Figure 4:
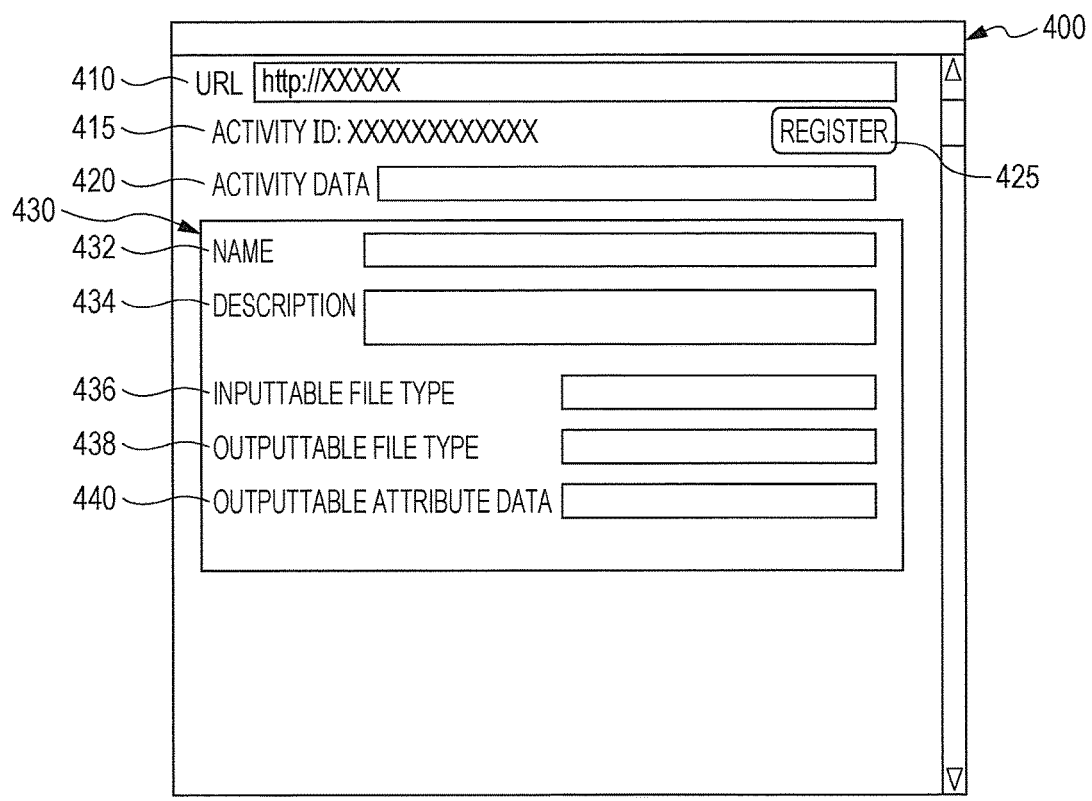
FIG. 4 illustrates a display example of an activity attribute registration screen.

FIG. 4 illustrates a display example of the activity attribute registration screen 400. The display controller 139 displays the activity attribute registration screen 400 that is a screen used to register an activity. For example, the activity attribute registration screen 400 displays an activity registration position specifying column 410, activity identification (ID) column 415, activity data column 420, registration button 425, and attribute information setting column 430. The activity registration position specifying column 410 displays a uniform resource locator (URL) where the corresponding activity is stored. The activity ID column 415 displays information (activity ID) that uniquely identifies the activity in the exemplary embodiment. The activity data column 420 displays data that is processed by the activity. If the register button 425 is selected, the activity defined on the activity attribute registration screen 400 is registered on the flow component specifications memory module 125.

The attribute information setting column 430 displays, in a ready-to-receive state, a name column 432, description column 434, inputtable file type column 436, outputtable file type column 438, and outputtable attribute data column 440. The name column 432 displays the name of the activity. The description column 434 displays the function and process contents of the activity. The inputtable file type column 436 displays the type of file inputtable to the activity. The outputtable file type column 438 display the tile type outputtable by the activity. The outputtable attribute data column 440 displays data attribute outputtable by the activity. The data attribute inputtable to the activity may also be additionally displayed.

When the user enters to each column, the activity is defined and registered on the flow component specifications memory module 125. For example, the activity is thus displayed in a selectable state as the activity 340 that serves as a flow configuration candidate on the activity list screen 300 in FIG. 3.

FIG. 5 illustrates a process example of the exemplary embodiment. Activities connectable ahead of and behind the activity specified by the user first are displayed in the relationship chart represented in a layer structure. The "activity specified first" is an activity serving as a base point.

If the user selects any activity on the relationship chart, a path from the selected activity to the activity serving as the base point is extracted. At least one of the following pieces of data about the path may refer to:

inputtable file type (for example, a list of file extensions), executable process contents (for example, a list of activity names), outputtable file types (for example, a list of file extensions), and outputtable attribute data (for example, lists of attribute names and attribute types (string, list, numeric, etc.)).

Upon confirming that the data the user has referred to matches what the user desires, the user may determine the partial flow as the path. This is repeated until the entire flow is created.

The process in FIGS. 5A through 5C is described more in detail.

Step S1

The activity list screen 300 displaying a list of activities is illustrated in FIG. 5A.

Step S2

If one of the activities the user desires to use (for example, a character recognition operation) is detected in response to the user operation, the flow creation control module 140 extracts activities connectable head of and behind that activity.

Specifically, if the activity 340d is selected as illustrated in FIG. 5A, the flow creation control module 140 extracts an activity group connectable ahead of an activity 550 centered on the activity 340d and places activities 540 as illustrated in FIG. 5B. Referring to FIG. 5B, five activities connectable ahead of the activity 550 are extracted and placed at a first front layer 540. An activity group connectable ahead of the first front layer 540 are extracted and placed at a second front layer 530. Referring to FIG. 5B, seven activities connectable ahead of the first front layer 540 are extracted and placed at the second front layer 530. Six activities connectable ahead of the second front layer 530 are extracted and placed at a third front layer 520. This operation is repeated until an activity serving as an input source appears. The activities connectable ahead of each activity are thus extracted.

An activity B connectable ahead of an activity A may now be extracted. To this end, attribute information on each activity is used. Specifically, the activity B is extracted on condition that the input file type of the activity A is included in output file types of the activity B. Furthermore, the activity B may be extracted if an additional condition that a parameter inputtable to the activity A is included in the attribute information output from the activity B is satisfied.

If the activity 340d is selected as illustrated in FIG. 5A, the flow creation control module 140 extracts an activity group connectable behind the activity 550 centered on the activity 340d and places activities 560 as illustrated in FIG. 5B. Referring to FIG. 5B, four activities connectable behind the activity 550 are extracted and placed at a first back layer 560. An activity group connectable behind each activity at the first back layer 560 is extracted and placed at a second back layer 570. Referring to FIG. 5B, five activities connectable behind each activity at the first back layer 560 are extracted and placed at the second back layer 570. Six activities connectable behind each activity at the second back layer 570 are extracted and placed at a third back layer 580. This operation is repeated until an activity serving as an output destination appears. The activities connectable behind each activity are thus extracted.

An activity D connectable behind an activity C may now be extracted. To this end, attribute information on each activity is used. Specifically, the activity D is extracted on condition that the output file type of the activity C is included in input file types of the activity D. Furthermore, the activity D may be extracted if an additional condition that the attribute information outputtable by the activity C is included in the parameter inputtable to the activity D is satisfied.

Step S3

The display controller 139 creates and displays the relationship chart that depicts the extracted activities in multi-layers. The connectable activities, when displayed, are connected with lines such that the relationship of the activities at the front and back layers extracted with respect to the activity serving as the base point is indicated.

For example, the activity A (placeable immediately ahead of the base point) extracted from the activity serving as the base point and the activity B (placeable immediately ahead of the activity A) are used. The activity serving as the base point and the activity A connected to each other by a broken line are displayed and the activity A and the activity B connected to each other by a broken line are displayed.

Similarly, the activity C (placeable immediately behind the base point) extracted from the activity serving as the base point and the activity D (placeable immediately behind the activity C) are used. The activity serving as the base point and the activity C connected to each other by a broken line are displayed and the activity C and the activity D connected to each other by a broken line are displayed. The following are displayed:

the left side of the activity serving as the base point displaying hierarchically displaying activities connectable ahead of the activity, and the right side of the activity serving as the base point hierarchically displaying activities connectable behind the activity.

The activity serving as the base point displays the following data:

inputtable file types (for example, a list of file extensions), executable process contents (for example, a list of activity names), outputtable file types (for example, a list file extensions), and outputtable attribute data (for example, lists of attribute names and attribute types (string, list, numeric, etc.)).

A flow creation screen 500 includes a third front layer 520, second front layer 530, first front layer 540, activity 550, first back layer 560, second back layer 570, third back layer 580, and activity attribute information display region 552.

Specifically, as illustrated in FIG. 5C, the activity 550 is displayed at the center of the flow creation screen 500 and the activity group at each layer extracted in step S2 is displayed. Specifically, the region of the first front layer 540 is set up to the left of the activity 550, and five activities are displayed in the region of the first front layer 540. The region of the second front layer 530 is set up to the left of the first front layer 540 and seven activities are displayed in the region of the second front layer 530. The region of the third front layer 520 is set up to the left of the second front layer 530 and six activities are display in the region of the third front layer 520.

In the opposite direction, the region of the first back layer 560 is set up to the right of the activity 550 and four activities are displayed in the region of the first back layer 560. The region of the second back layer 570 is set up to the right of the first back layer 560 and five activities are displayed in the region of the second back layer 570. The region of the third back layer 580 is set up to the right of the second back layer 570 and six activities are displayed in the region of the third back layer 580.

The activity attribute information display region 552 is displayed in a vicinity of the activity 550. The activity attribute information display region 552 displays the attribute information on the activity 550. For example, the activity attribute information display region 552 indicates that "inputtable file type" includes "tiff" and "xdw", "outputtable file type" includes "tiff" and "xdw", and "outputtable attribute data" is character recognition results (string). The attribute information in the activity attribute information display region 552 is information defined by the activity attribute registration screen 400 and is stored on the flow component specifications memory module 125.

FIGS. 6A and 6B illustrate a process example of the exemplary embodiment.

Step S4

With only the selected activity serving as the base point, the user may be unable to do what they desire to do. Even if the user can do what they desire to do, the user may still desire to decide the input source and output destination or find an additional function. In such a case, the user may perform an operation to select another activity present ahead of or behind the selected activity.

If a front activity is selected, a path from the selected activity to the activity serving as the base point is highlighted such that the inputtable file type, the executable process, outputtable file type, and outputtable attribute data are thus referred to in the partial flow as the path.

Specifically, referring to FIG. 6A1, the user may now have selected an activity 522 ahead of the activity 550. A path from the activity 522 to the activity 550 is extracted. The path includes the activity 522, activity 532, activity 542, and activity 550. In other words, if the activity 522 on the flow creation screen 500 is selected in response to user operation, the path from the activity 522 to the activity 550 is created. The activity 532 is extracted from the second front layer 530 and the activity 542 is extracted from the first front layer 540. The path of the activity 522, activity 532, activity 542, and activity 550 is thus formed.

The activity group forming the path is thus highlighted. The highlighting may be performed such that the activities included in the activity group forming the path are distinguished from the activities not included in the activity group. Distinguishing activities in display form may be implemented by changing shape, pattern, or color thereof, or dynamically changing the activities, or blinking the activities, or these display forms may be combined.

Referring to FIG. 6A2, the attribute information on the path (partial flow) from the activity 522 to the activity 550 is displayed on a partial flow attribute information display region 652. Specifically, the partial flow attribute information display region 652 indicates that the inputtable file type is "ff, bmp, pngti, jpg", the executable process is "format conversion→document name conversion→image processing→character recognition operation", the outputtable file type is "tiff, xdw", and the outputtable attribute data is "document format name (string), rotation angle (string), character recognition results (string)". The inputtable file type may be the inputtable file type in the activity 522 at the head of the partial flow. The executable process may be organized by the executable process in the activities 522, 532, 542, and 550 forming the partial flow. The outputtable file type may be the outputtable file type in the activity 550 at the tail of the partial flow. The outputtable attribute data may be may be organized by combining the outputtable attribute data in the activities 522, 532, 542, and 550 forming the partial flow.

If one subsequent activity is selected, a path from the activity serving as the base point to the selected activity is highlighted in a manner such that the inputtable file type, executable process, outputtable file type, and outputtable attribute data in the partial flow as the path are referred to.

Specifically, referring to FIG. 6B1, an activity 572 behind the activity 550 may now be selected. A path from the activity 550 to the activity 572 is extracted. The path includes the activities 550, 562, and 572. In other words, if the activity 572 on the flow creation screen 500 is selected in response to the user operation, the path from the activity 550 to the activity 572 is created. Specifically, the activity 562 is extracted from the activity 572, the activity 550 is extracted from the activity 562, and the path of the activities 550, 562, and 572 is thus created.

In a way similar to FIG. 6A2, the activity group forming the path is highlighted.

Referring to FIG. 6B2, the attribute information on the path (partial flow) from the activity 550 to the activity 572 is displayed on a partial flow attribute information display region 654. Specifically, the partial flow attribute information display region 654 indicates that the inputtable file type is "png,jpg", the executable process is "character recognition analysis→barcode analysis→folder storage", the outputtable file type is "tiff, xdw", and the outputtable attribute data is "character recognition results (text), barcode analysis results (text), output file name (text), and output destination (text)". The inputtable file type is the inputtable file type in the activity 550 at the head of the partial flow. The executable process may be organized by combining the executable process in the activities 550, 562, and 572 forming the partial flow. The outputtable file type may be the outputtable file type in the activity 572 at the tail of the partial flow. The outputtable attribute data may be organized by combining the outputtable attribute data in the activities 550, 562, and 572 forming the partial flow.

Step S5

If an activity desired in the flow is selected and a confirm button is selected, the partial flow is created. Activity candidates ahead of and behind the selected activity are also displayed. Referring to FIG. 6C1, if the activity 522 is selected by the user to create the path from the activity 522 to the activity 550, only the activities belonging to the path are displayed and the other activities belonging to the same layer are erased from the flow creation screen 500. In this way, the other activities at the same layer as the activity 532 and the other activities as the same layer as the activity 542 become invisible to the user and only the activities forming the path are visible to the user.

Step S6

The above operation is repeated to create the flow. For example, referring to FIG. 6C2, the activity 572 behind the activity 550 may now be selected by the user. The path from the activity 550 to the activity 572 is extracted. The path includes the activities 550, 562, and 572. In other words, if the activity 572 on the flow creation screen 500 is selected in response to the user operation, the activity 562 is extracted from the activity 572 and the activity 550 is extracted from the activity 562 to create the path from the activity 550 to the activity 572. The path of the activities 550, 562, and 572 is thus created.

In a way similar to FIG. 6B2, the activity group forming the path is highlighted. The attribute information on the path (the partial flow) from the activity 522 to the activity 572 is displayed on a partial flow attribute information display region 656. Specifically, the partial flow attribute information display region 656 indicates that the inputtable file type is "tiff, bmp, png, jpg", the executable process is "format conversion→document name conversion→image processing→character recognition operation→format conversion→folder storage", the outputtable file type is "tiff, xdw, pdf, txt, docx", and the outputtable attribute data is "document format name (text), document name (text), rotation angle (text), character recognition results (text)". The inputtable file type may be the inputtable file type in the activity 522 at the head of the partial flow. The executable process may be organized by combining the executable processes in the activities 522, 532, 542, 550, 562, and 572 forming the partial flow. The outputtable file type may be the outputtable file type in the activity 572 at the tail of the partial flow. The outputtable attribute data may be organized by combining the outputtable attribute data in the activities 522, 532, 542, 550, 562, and 572 forming the partial flow.

Via steps S3 and S4, the user may learn whether what they desire can be accomplished with a single activity or multiple activities. Specifically, if the single activity is sufficient, the activity selected first remains alone and there are no activities connected ahead of or behind the selected activity. If multiple activities are involved, activities connected ahead of or behind are present.

To create the flow, the user may learn which functions to operatively couple ahead of and behind a desired function. Specifically, since an activity connectable to the activity serving as the base point is displayed, the user may create the flow by simply selecting that activity.

The user may thus organize into the flow what they desire to do. Without learning the contents of all the activities and the whole flow creation, the user may start creating the flow starting with what they desire.

Figure 7B:
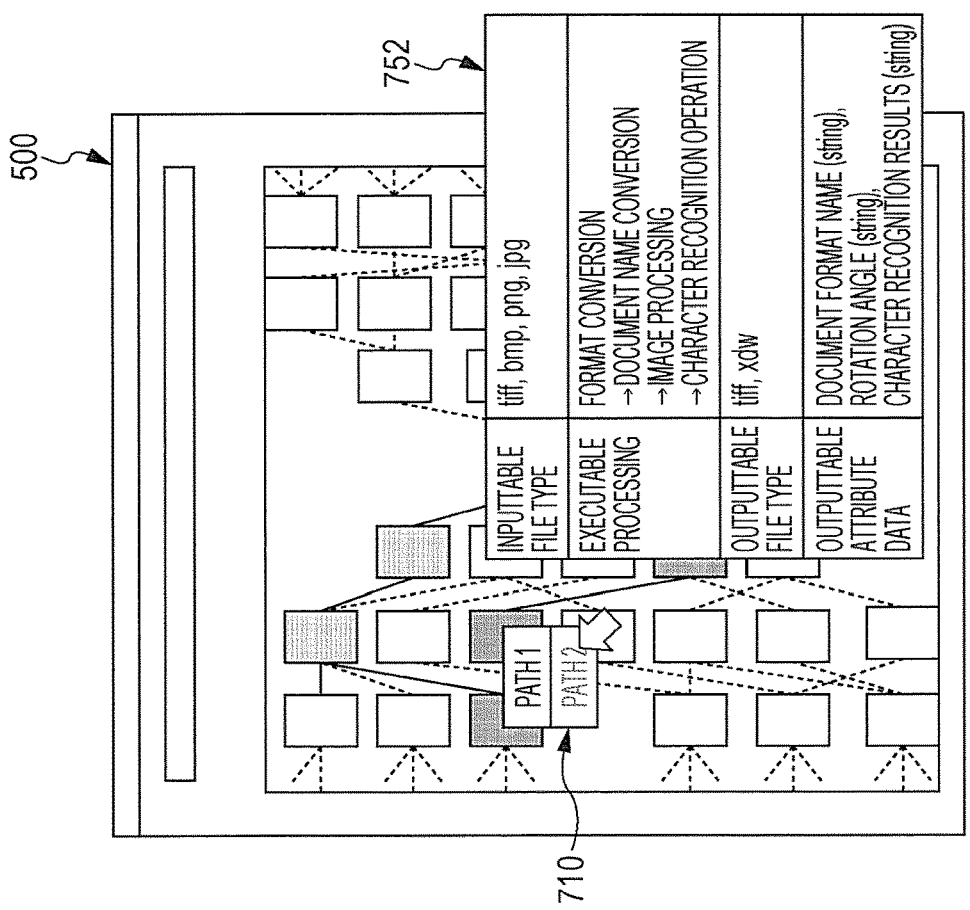
FIGS. 7A and 7B illustrate a process example of the exemplary embodiment.
Figure 7A:
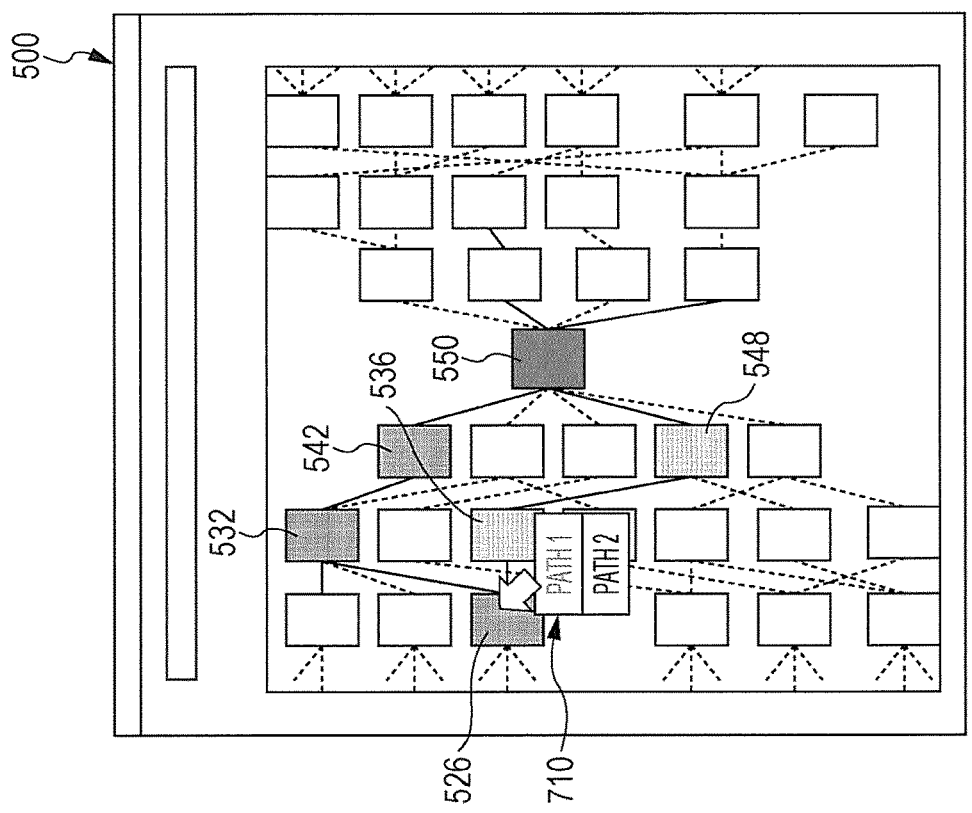

FIGS. 7A and 7B illustrate a process example of the exemplary embodiment. If multiple paths from the activity serving as the base point to the selected activity are present, they are highlighted and a list of the paths is also displayed. The order of display of the paths may be the order of frequency of uses. The partial flow of the path selected by the user from the path list is selectively highlighted and thus the inputtable file type, executable process, outputtable file type, and outputtable attribute data in the partial flow are displayed.

FIG. 7A illustrates the activity 550 serving as the base point and also illustrates two paths if an activity 526 is selected. Specifically, one path includes activities 526, 532, 542, 550 and the other path includes activities 526, 536, 548, and 550. A path selection region 710 is displayed in a vicinity of the selected activity 526. The path selection region 710 indicates that path 1 and path 2 are available to go to the activity 550 from the activity 526 and that one of path 1 and path 2 is selectable.

FIG. 7B illustrates a partial flow attribute information display region 752 that is displayed if the path 2 in the path selection region 710 is selected. The attribute information on the path 2 in the partial flow attribute information display region 752 indicates that the inputtable file type is "ff, bmp, png, jpg", the executable process is "format conversion→document name conversion→image processing→character recognition operation", the outputtable file type is "tiff, xdw", and the outputtable attribute data is "document format name (string), rotation angle (string), or character recognition results (string)".

Figure 8B:
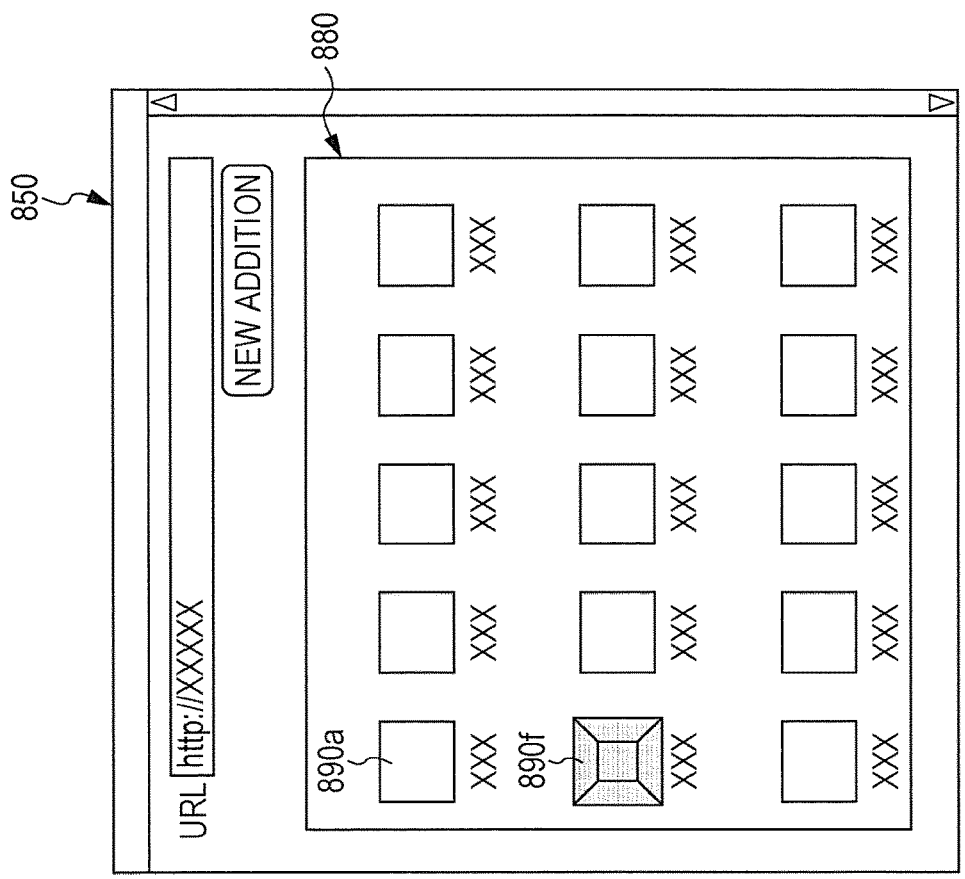
FIGS. 8A and 8B illustrate a process example of the exemplary embodiment.
Figure 8A:
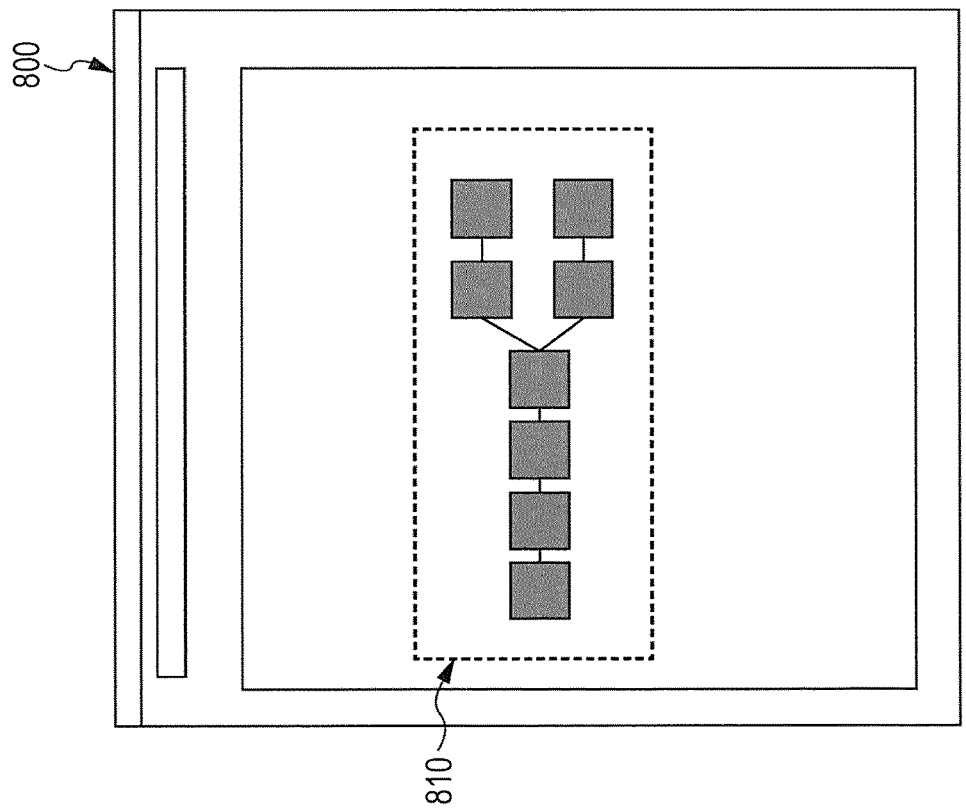

FIGS. 8A and 8B illustrate a process example of the exemplary embodiment. A selected path is set to be selectable as a new activity and an ordinary activity and an activity having a path therewithin are displayed in a mutually different form. The path selectable as an activity may be a complete flow or a partial flow before being completed.

Step S7

Referring to FIG. 8A, the above process is repeated to organize partial flows to create a complete flow 810.

Step S8

Referring to FIG. 8B, the partial flow and the complete flow 810 are registered on the flow memory module 130 and displayed on an activity list screen 850.

In an activity (path) 890*f* on the activity list screen 850, the partial flow or the complete flow 810 formed in FIG. 8A is selectable as an activity. The activity (path) 890*f* may be different in display form from another activity, such as an activity 890*a*. Specifically, the activity (path) 890*f* is patterned such that it looks a three-dimensional push button. The ordinary activity 890*a* is a single activity and is not a flow. The activity (path) 890*f* is a flow including multiple activities.

FIGS. 9A and 9B illustrate a process example of the exemplary embodiment. If the attribute information on the specifications of the activity is modified, other activities connected to the activity are re-extracted to be displayed in accordance with the modified attribute information.

Referring to FIG. 9A, the attribute information on an activity 950*a* is modified in response to user operation. For example, if the activity 950*a* is selected and the operation to modify the attribute information is received, an activity attribute information display region 952 to display the attribute information on the activity 950*a* is displayed. The activity attribute information display region 952 is identical to the activity attribute registration screen 400 in FIG. 4. The attribute information may be modified by operating the activity attribute information display region 952. For example, if multiple parameters are included, the number of parameters may be reduced. For example, if the current inputtable file type is tiff or Jpeg, the inputtable file type may be limited to tiff. If the current outputtable attribute data is "(a, string), (b, list), and (c, numeric)", the outputtable attribute data may be limited to "(a, string)".

In response to the modification of the attribute information on the activity 950*a*, an activity connectable to the activity 950*a* is re-extracted and displayed on a flow creation screen 900.

A process parameter of the activity 950*a* on the activity attribute information display region 952 in FIG. 9A is modified in response to user operation, resulting in an activity 950*b*. Referring to FIG. 9B, activities B connectable to the activity 950*b* (specifically, the activities B at a first front layer 940 and a first back layer 960) change. In response to the change of the activities B, activities C (specifically, activities at a second front layer 930 and a second back layer 970) connectable to the activities B change. Activities connectable change in a similar fashion.

Specifically, before the modification of the attribute information, five activities are present at the first front layer 940 as the activities connectable ahead of the activity 950*a* but after the modification of the attribute information, the number of activities at the first front layer 940 connectable to the activity 950*a* is reduced to three as illustrated in FIG. 9B. Along with this, seven activities at the second front layer 930 are reduced to five activities at the second front layer 930 after the modification of the attribute information.

Before the modification of the attribute information, three activities are present at the first back layer 960 as the activities connectable to the activity 950a from behind but after the modification of the attribute information, the number of activities at the first back layer 960 connectable to the activity 950a is reduced to two as illustrated in FIG. 9B. Along with this, five activities at the second back layer 970 are reduced to two activities at the second back layer 970 after the modification of the attribute information. Similarly, the number of activities at the third back layer 980 is reduced. Conversely, there is a case in which the number of activities increases in each layer and the activities themselves may change at each layer.

In this way, the partial flow may be verified and confirmed with reference to the relationship chart that is limited to the parameters the user actually uses. The user may create a flow that meets what they desire.

Figure 10:
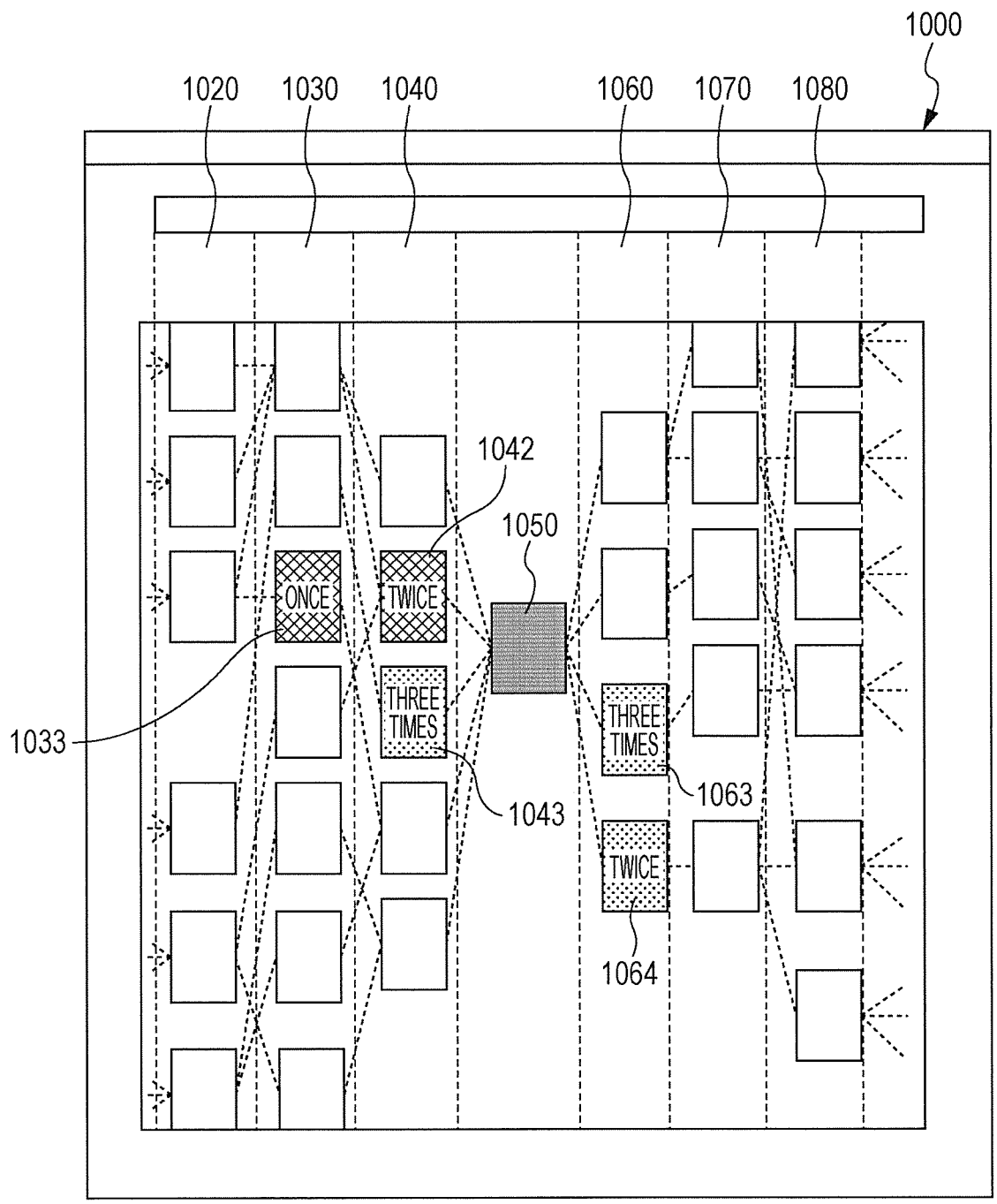
FIG. 10 illustrates a process example of the exemplary embodiment.

FIG. 10 illustrates a process example of the exemplary embodiment. The activity B other than the activity A serving as the base point is displayed in a manner such that the activity B having a higher frequency of uses is closer to the activity A. The frequency of uses may include the frequency X of uses in a flow created in the past by the current user and the frequency Y of uses in all the flows created in the past. The activity B may be displayed in a different form from the frequency X of uses to the frequency Y of uses.

Specifically, flow registration log information registered by the user and flow registration log information registered by another user may be used.

Referring to FIG. 10, a group (1) including activities frequently used in cooperation in all registered flows (activities 1033 and 1042) and a group (2) activities frequently used in cooperation by the user (activities 1043, 1063, and 1064) are together displayed on a flow creation screen 1000. The group (1) is displayed in pink color and the group (2) is displayed in blue color for distinction. The frequency of uses is also indicated by number.

Referring to FIG. 10, an activity 1042 at a first front layer 1040 is used twice in all the flows in cooperation with an activity 1050. An activity 1043 at the first front layer 1040 is used three times in a user flow in cooperation with the activity 1050. An activity 1033 at a second front layer 1030 is used once in all the flows in cooperation with the activity 1050. An activity 1063 at a first back layer 1060 is used three times in the user flow in cooperation with the activity 1050. An activity 1064 at the first back layer 1060 is used twice in the user flow in accordance with the activity 1050.

An activity more frequently used in cooperation with another activity (namely, an activity having a higher frequency of uses) is displayed closer to the activity 1050 serving as the base point. A less frequently used activity is displayed farther from the activity 1050. The user thus more easily notices and selects the activity having a higher frequency of uses. Activities displayed above the activity 1050 are included in other flows and activities displayed below the activity 1050 are included in the flow created by the user. A more frequently used activity may be displayed in an icon more outstanding or in an icon having a larger size on the screen. For example, an activity used more frequently used in cooperation with another activity is displayed in a larger size and an activity used less frequently is displayed in a smaller size.

Specifically, for example, at the first layer, an activity having a higher frequency Y of uses created in the past in all the flows is placed closer to the activity 1050 and an activity having a lower frequency Y of uses is placed closer to the activity 1050. Given the same frequency of uses, an activity having a higher frequency X of uses in the flow created in the past by the current user may be displayed in a larger icon and an activity having a lower frequency X of uses may be displayed in a smaller icon.

At the second layer, each time connection is made with an icon at the first layer, an activity having a higher frequency Y of uses in all the flows created in the past is placed closer to the activity 1050 and an activity having a lower frequency Y of uses is placed farther from the activity 1050. Given the same frequency of uses, an activity having a higher frequency X of uses in the flow created in the past by the current user is displayed in a larger icon and an activity having a lower frequency X of uses is displayed in a smaller icon.

A predetermined threshold may serve as criteria of determining whether the frequency of uses is high or low. The activities are sorted into a rank according to the frequency of uses and a predetermined place in the rank may serve as the criteria. Each activity is thus determined whether it has a higher or lower place than the predetermined place. A determination as to whether an icon is larger or smaller may be made in accordance with a predetermined sized icon. A determination as to whether an icon is larger or smaller may be made in accordance with the icon of a predetermined activity (such as the icon of the activity 1050 or an icon of an activity before modification).

An icon of an activity at a layer farther from the activity 1050 may be reduced a smaller size. For example, among activities behind the activity 1050 (on the right side in FIG. 10), an icon of an activity at an n-th layer may be sized to be 95% of an icon of an activity at an (n−1)-th layer. In this way, as a layer is deeper and less frequently used, it is displayed in a smaller icon. The activities may thus be easily selected.

Conversely, the above display rule may be set to be switchable such that as an activity having a lower frequency of uses is displayed not only closer but also in a larger size. The user may notice an activity that would otherwise be overlooked.

Figure 11A:
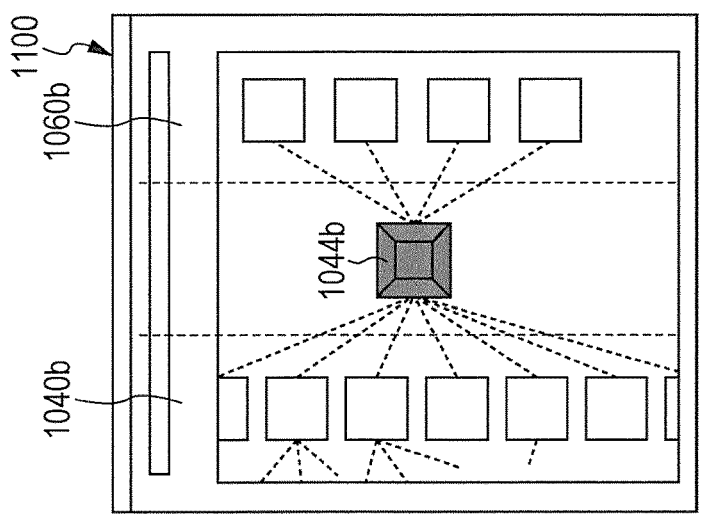
FIGS. 11A through 11C illustrate a process example of the exemplary embodiment.
Figure 11B:
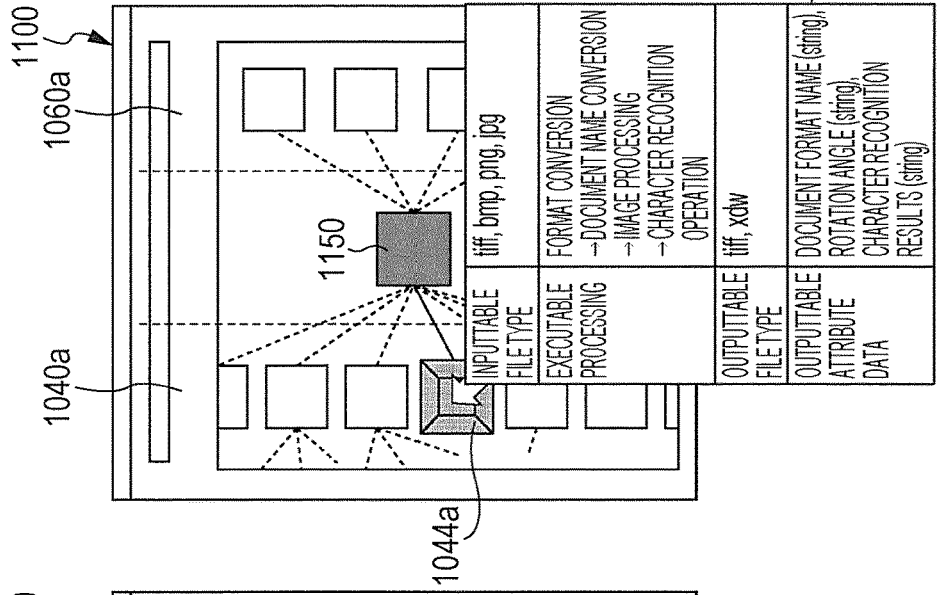
Figure 11C:
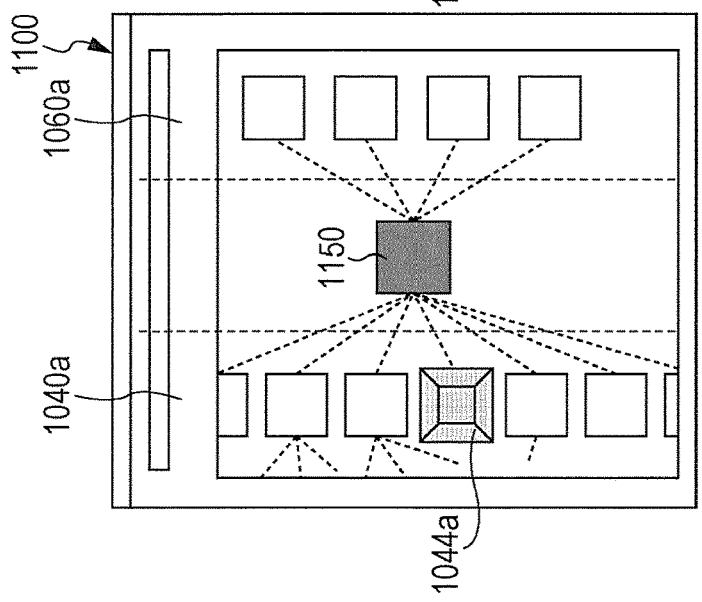

FIGS. 11A through 11C illustrate a process example of the exemplary embodiment. In a way similar to FIGS. 8A and 8B, a path is selectable as an activity. Referring to FIGS. 11A through 11C, the activity (path) is displayed as a selectable activity.

Referring to FIG. 11A, a registered flow has an input and output in the same manner as another activity and is displayed in the relationship chart on a flow creation screen 1100. Specifically, FIG. 11A indicates an activity (path) 1044a connectable ahead of an activity 1150.

Referring to FIG. 11B, the attribute information including contents defined by the flow is confirmed as an activity (path) 1044a connectable ahead of the activity 1150 by displaying an activity attribute information display region 1149. The activity attribute information display region 1149 indicates the attribute information on the activity (path) 1044a and thus indicates that the inputtable file type is "ff, bmp, png, jpg", the executable process is "format conversion→document name conversion→image processing→character recognition operation", the outputtable file type is "tiff, xdw", and the outputtable attribute data is "document format name (string), rotation angle (string), character recognition results (string)".

Referring to FIG. 11C, like another activity, a registered flow may be selected as an activity serving as the base point. Specifically, with an activity (path) 1044b serving as the base point, activities connectable ahead of and behind the activity (path) 1044*b* are displayed on the flow creation screen 1100.

Like the activity, the complete flow or partial flow may be specified as an activity serving as the base point. These may be included in the relationship chart as activities connectable ahead of or behind another activity. The types of activities may thus be increased and the flow that performs what is desired may be more easily created.

Figure 12C:
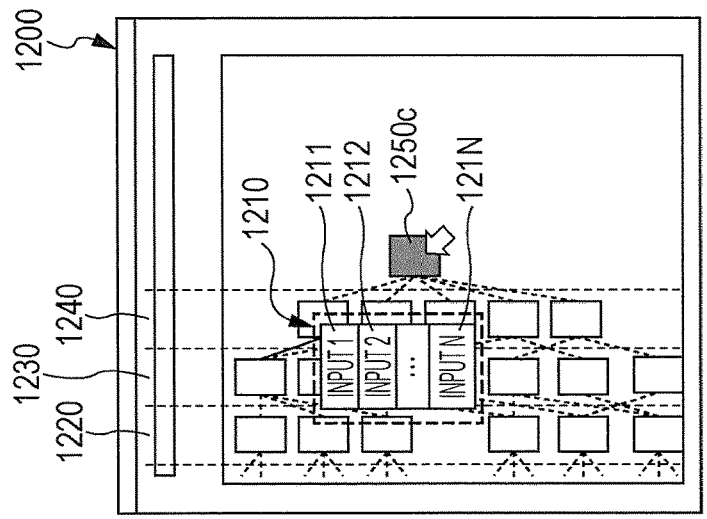
FIGS. 12A through 12C illustrate a process example of the exemplary embodiment.
Figure 12B:
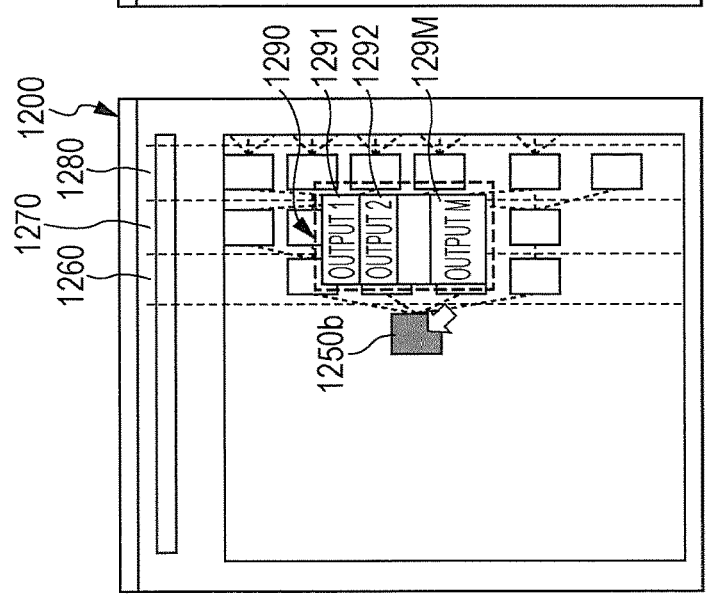
Figure 12A:
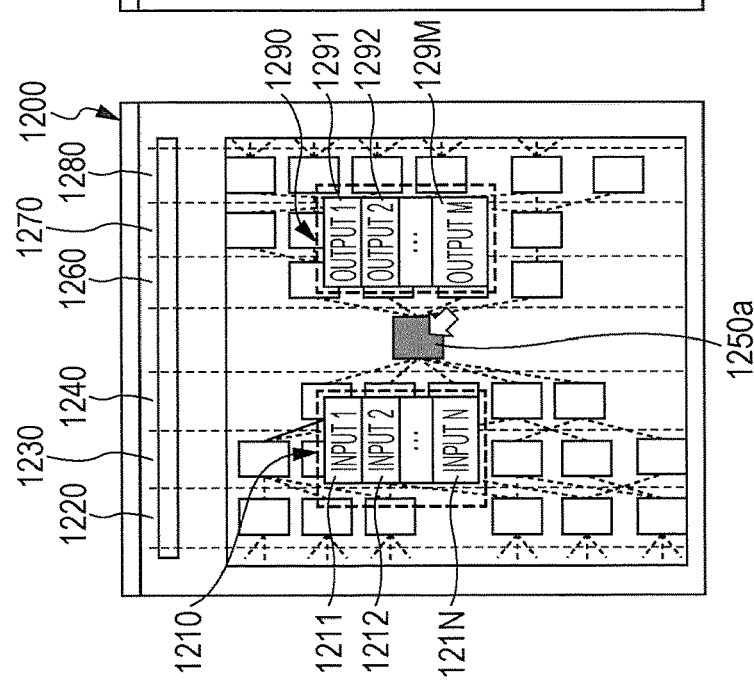

FIGS. 12A through 12C illustrate a process example of the exemplary embodiment. FIGS. 12A, 12B, and 12C respectively the activity serving as the base point in the middle of the flow, the activity serving as the base point at the head of the flow, and the activity serving as the base point at the tail of the flow. If the activity serving as the base point is at the head of the flow, the activity has no activities connectable ahead thereof and is called an input source activity. If the activity serving as the base point is at the tail of the flow, the activity has no activities connectable behind and is called an output destination activity.

FIG. 12A illustrates the activity serving as the base point that is neither the input source nor the output destination and also illustrates an input source activity list 1210 that is a list of connectable input source candidates and an output destination activity list 1290 that is a list of output destination candidates. The input source activity list 1210 displays input source activities 1211, 1212, . . . , 121N. The output destination activity list 1290 displays output destination activities 1291, 1292, . . . , 129M.

These lists display the activities by sorting according to the order determined as follows:

order of higher to lower frequency of uses in combination with a selected activity, order of higher to lower frequency of uses, order of shorter to longer process path in combination with the selected activity, or order of longer to shorter process path in combination with the selected activity.

The activities may be displayed in accordance with the order of sorting uniquely determined in advance or in accordance with the order the user has specified using user interface (UI).

Referring to FIG. 12B, if the activity serving as the base point is an input source, the output destination activity list 1290 that is a list of connectable output destination candidates is displayed.

The list may be displayed by sorting according to the order determined as follows:

order of higher to lower frequency of uses in combination with an activity selected as an input source, order of higher to lower frequency of uses, order of shorter to longer process path in combination with the selected activity, or order of longer to shorter process path in combination with the selected activity.

The activities may be displayed in accordance with the order of sorting uniquely determined in advance or in accordance with the order the user has specified using user interface (UI).

Referring to FIG. 12C, if the activity serving as the base point is an output destination, the input source activity list 1210 that is a list of connectable input source candidates is displayed.

The list may be displayed by sorting according to the order determined as follows:

order of higher to lower frequency of uses in combination with an activity selected as an output destination, order of higher to lower frequency of uses, order of shorter to longer process path in combination with the selected activity, or order of longer to shorter process path in combination with the selected activity.

The activities may be displayed in accordance with the order of sorting uniquely determined in advance or in accordance with the order the user has specified using user interface (UI).

FIG. 13 illustrates a conceptual modular configuration as a specific example of the exemplary embodiment. The UI module 1335 is a specific example of the UI module 135 in FIG. 1. Each of an activity registration module 1342, UI data creation module 1344, relationship chart creation module 1346, flow information creation module 1348, and flow creation module 1350 is a specific example of the flow creation control module 140 in FIG. 1. A database (DB) 1315 is an example of the data memory 115 in FIG. 1.

The DB 1315 is connected to the activity registration module 1342, UI data creation module 1344, relationship chart creation module 1346, flow information creation module 1348, and flow creation module 1350. The DB 1315 manages information on activities and information on created flows.

For example, the information on the activities includes:

identification information (activity ID) uniquely identifying each activity on the information processing apparatus 100, name of an activity, inputtable file type of the activity, outputtable file type of the activity, and outputtable attribute information of the activity.

The information on the activities may further include inputtable parameter of the activity.

For example, the information on the flows may include:

identification information (flow ID) uniquely identifying a flow on the information processing apparatus 100, and list of activity IDs forming the flow.

The UI module 1335 is connected to the activity registration module 1342, UI data creation module 1344, relationship chart creation module 1346, flow information creation module 1348, and flow creation module 1350. The UI module 1335 displays a variety of information to the user and receives an operation from the user.

The activity registration module 1342, UI data creation module 1344, relationship chart creation module 1346, flow information creation module 1348, and flow creation module 1350 are connected to each of the DB 1315 and the UI module 1335.

The activity registration module 1342 registers an activity on the DB 1315 (in particular, the flow component specifications memory module 125). The registered activity may be used as a component forming the flow.

When the activity is registered, the following attribute information is also registered in association with the activity:

a) file type that is processable (or inputtable) by activity (for example, a list of file extensions), b) process contents (for example, description of a process), c) file type outputtable by the activity (for example, a list of file extensions), d) attribute information outputtable by the activity (for example, attribute name and type of attribute (string, numeric, etc.)).

The attribute information a), b), and c) are typically used. In addition to the attribute information a) through d), a parameter inputtable to the activity may be added.

The UI data creation module 1344 creates a variety of data to be displayed on the display 187 and then displays the created data on the display 187. From activity information and flow information registered on the DB 1315, the UI data creation module 1344 creates data that is viewable in a list on the display 187 and then causes the display 187 to display the created data.

The UI data creation module 1344 creates screen data used to register the activities and causes the display 187 to display the screen data.

The UI data creation module 1344 creates data to be displayed on the display 187 in accordance with data created by the relationship chart creation module 1346, flow information creation module 1348, flow creation module 1350, and the like. The UI data creation module 1344 then causes the display 187 to display the created data.

The relationship chart creation module 1346 extracts from the DB 1315 an activity connectable ahead of or behind the activity serving as the base point specified on the display 187 and creates a relationship chart. The creation process of the relationship chart is described below with reference to FIG. 17.

The flow information creation module 1348 extracts (retrieves) from the DB 1315 information on the activity serving as the base point in the relationship chart displayed on the display 187 and creates "flow reference data" that is the attribute information. If another activity is selected on the relationship chart, the flow information creation module 1348 extracts from the DB 1315 a flow connecting the activity serving as the base point to the selected activity and creates the flow reference data on the flow.

The flow creation module 1350 creates the flow connecting the activity serving as the base point to the selected activity in the relationship chart on the display 187 and registers the created flow information on the DB 1315.

Figure 14:
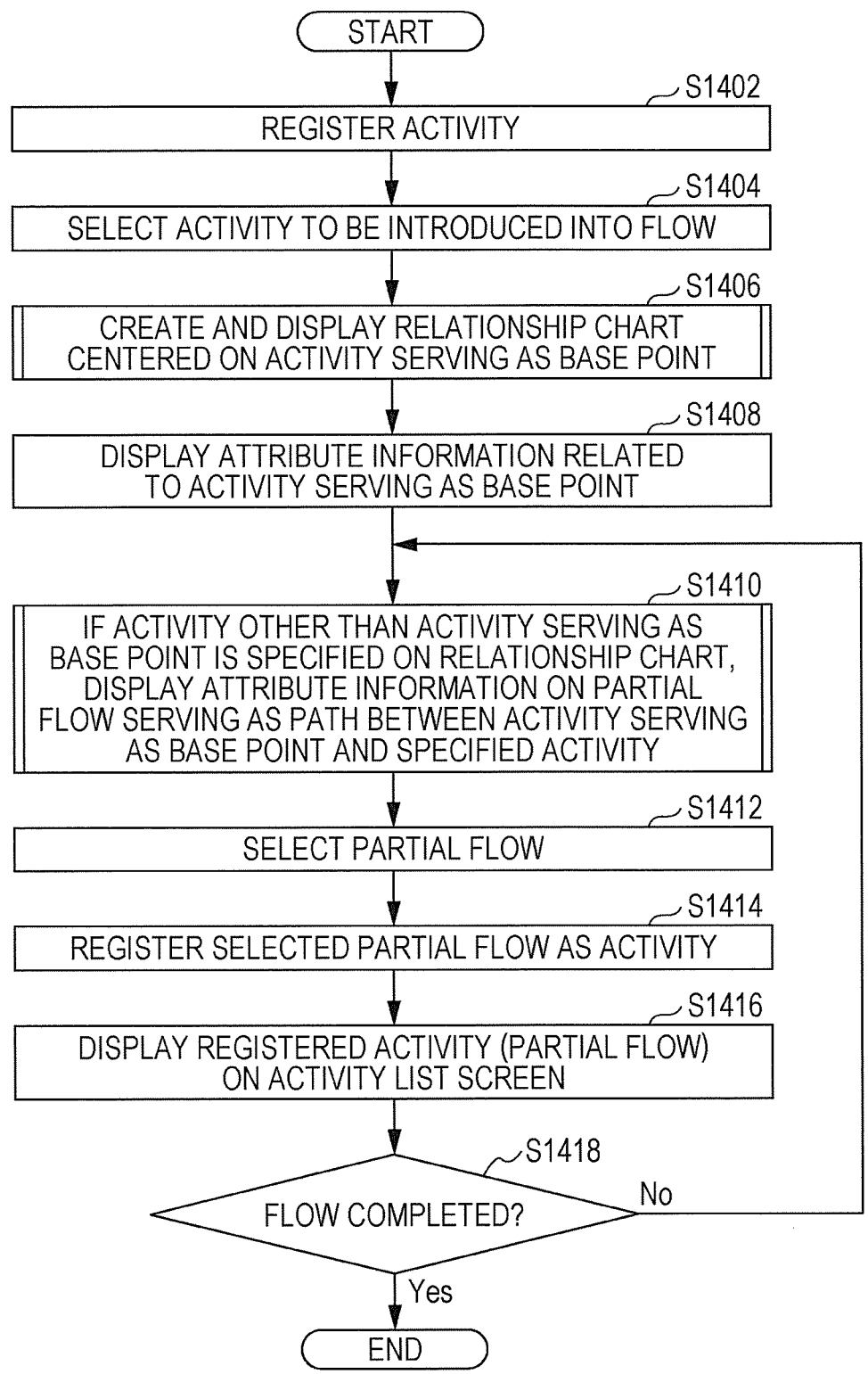
FIG. 14 is a flowchart illustrating a process example of the exemplary embodiment.

FIG. 14 is a flowchart illustrating a process example performed by the configuration in FIG. 13. In step S1402, an activity is registered. For example, the new addition button 320 is selected on the activity list screen 300 described with reference to FIG. 3. The name, description, inputtable file type, outputtable file type, outputtable attribute data are set on the activity attribute registration screen 400 described with reference to FIG. 4.

The settings may be entered as described below. The name of an activity is entered in the name column 432 and the description of the activity is entered in the description column 434.

The inputtable file type column 436 is set as follows:
from among tiff, jpeg, bmp, png, pdf, and xdw, extensions of files processable in the activity are concatenated with a comma (,) and then specified as a character string,
if all files are processable, the character string "all" is specified, and
if there is no processable file, a blank character string is specified.

An outputtable file type column 438 is set as follows:
from among tiff, jpeg, bmp, png, pdf, and xdw, extensions of files outputtable by the activity are concatenated with a comma (,) and then specified as a character string,
if the same file types as the input file types are output, the character string "all" is specified, and
if there is no outputtable file, a blank character string is specified.

In the outputtable attribute data column 440, attribute names (types of attributes (string, numeric, etc.)) are concatenated with a comma (,) and then specified as a character string.

The attribute information thus set is registered together with activity data on the DB 1315 at the timing the register button 425 is selected.

According to the exemplary embodiment, the user manually registers during the registration of an activity. For example, a rule may be set on the information processing apparatus 100 in advance. An activity may be simply developed and registered in accordance with the rule. The information processing apparatus 100 may then automatically extract and register the name, description, inputtable file type, outputtable file type, and outputtable attribute data on the DB 1315. The rule may be defined in a specific setting file interpreted by the information processing apparatus 100 or an activity as the rule may be developed as a service having a specific interface.

For example, information to be registered on the DB 1315 in step S1402 may be an activity registration information table 1500. FIG. 15 illustrates a data structure of the activity registration information table 1500. The activity registration information table 1500 includes an activity identification (ID) column 1505, name column 1510, description column 1515, inputtable file type column 1520, outputtable file type column 1525, outputtable attribute data column 1530, and activity data column 1535. The activity ID column 1505 stores information uniquely identifying an activity (specifically, activity ID). The name column 1510 stores the name of the activity. The description column 1515 stores the description of the activity. The inputtable file type column 1520 stores an inputtable file type. The outputtable file type column 1525 stores an outputtable file type. The outputtable attribute data column 1530 stores outputtable attribute data. The activity data column 1535 stores activity data.

The first row of the activity registration information table 1500 stores "GUID 1" at the activity ID column 1505, "format conversion" at the name column 1510, "converting input image to specified format and outputting converted image" at the description column 1515, "tiff, jpeg, png" at the inputtable file type column 1520, "pdf, tiff, bmp, xdw" at the outputtable file type column 1525, "conversion format: character string, resolution: numerical value" at the outputtable attribute data column 1530, and "***" at the activity data column 1535**.

The second row of the activity registration information table 1500 stores "GUID 2" at the activity ID column 1505, "image processing" at the name column 1510, "rotating input image and outputting rotated image" at the description column 1515, "tiff, bmp" at the inputtable file type column 1520, "tiff, bmp" at the outputtable file type column 1525, "N/A" at the outputtable attribute data column 1530, and "***" at the activity data column 1535**.

The third row of the activity registration information table 1500 stores "GUID 3" at the activity ID column 1505, "document name setting" at the name column 1510, "changing name of input image file to specified name" at the description column 1515, "tiff, jpeg, bmp, png, pdf, xdw" at the inputtable file type column 1520, "tiff, jpeg, bmp, png, pdf, xdw" at the outputtable file type column 1525, "file name: character string" at the outputtable attribute data column 1530, and "***" at the activity data column 1535**.

The fourth row of the activity registration information table 1500 stores "GUID 4" at the activity ID column 1505, "character recognition operation, QR code analysis" at the name column 1510, "outputting results of character recognition of input image and results of analysis of QR code on input image" at the description column 1515, "pdf, tiff, bmp" at the inputtable file type column 1520, "pdf, tiff, bmp" at the outputtable file type column 1525, "character recognition result: character string, QR code analysis results: character string" at the outputttable attribute data column 1530, and "***" at the activity data column 1535**.

The fifth row of the activity registration information table 1500 stores "GUID 5" at the activity ID column 1505, "folder outputting" at the name column 1510, "storing image received in confidential box in predetermined folder" at the description column 1515, "tiff, jpeg, bmp, png, pdf, xdw" at the inputtable file type column 1520, "N/A" at the outputtable file type column 1525, "file storage destination: character string" at the outputttable attribute data column 1530, and "***" at the activity data column 1535**.

The sixth row of the activity registration information table 1500 stores "GUID 6" at the activity ID column 1505, "confidential box inputting" at the name column 1510, "storing image received in confidential box in predetermined folder" at the description column 1515, "N/A" at the inputtable file type column 1520, "tiff, jpeg, bmp, png, pdf, xdw" at the outputtable file type column 1525, "date of reception: date, received file name: character string" at the outputttable attribute data column 1530, and "***" at the activity data column 1535**.

The seventh row of the activity registration information table 1500 stores "GUID 7" at the activity ID column 1505, "fax input" at the name column 1510, "storing fax-received image in predetermined folder" at the description column 1515, "N/A" at the inputtable file type column 1520, "tiff" at the outputtable file type column 1525, "date of transmission: date, transmitted file name: character string" at the outputttable attribute data column 1530, and "***" at the activity data column 1535**.

The eighth row of the activity registration information table 1500 stores "GUID 8" at the activity ID column 1505, "zip compression" at the name column 1510, "compressing input file in predetermined format" at the description column 1515, "not specified" at the inputtable file type column 1520, "zip" at the outputtable file type column 1525, "file name: character string" at the outputttable attribute data column 1530, and "***" at the activity data column 1535**.

The ninth row of the activity registration information table 1500 stores "GUID 9" at the activity ID column 1505, "mail transmission" at the name column 1510, "mail-transmitting input image to predetermined destination" at the description column 1515, "not specified" at the inputtable file type column 1520, "N/A" at the outputtable file type column 1525, "destination: character string, sender: character string" at the outputttable attribute data column 1530, and "***" at the activity data column 1535**.

The N-th row of the activity registration information table 1500 stores "GUID N" at the activity ID column 1505, "GoogleDrive registration" at the name column 1510, "storing input image at predetermined location on GoogleDrive" at the description column 1515, "not specified" at the inputtable file type column 1520, "N/A" at the outputtable file type column 1525, "file name: character string" at the outputttable attribute data column 1530, and "***" at the activity data column 1535**.

In step S1404, an activity to be introduced into the flow is selected. For example, in response to a user operation, a specific activity (hereinafter referred to as the activity serving as the base point) is selected on the activity list screen 300 as illustrated in FIG. 3. For example, if a cursor is placed on an activity displayed in a list, a "description" registered on the activity attribute registration screen 400 in FIG. 4 may be retrieved from ID information on the activity at the cursor position and displayed on the screen.

In step S1406, a relationship chart centered on the activity serving as the base point is created and displayed. The details of the operation in step S1406 are described in a flowchart in FIG. 17.

In step S1408, the attribute information on the activity serving as the base point is displayed. The "flow reference data" including at least one of the following items is created from the attribute information on the activity serving as the base point and displayed on the display 187:

file types inputtable to the activity serving as the base point (for example, a list of file extensions), process contents of the activity serving as the base point (for example, name or description of the activity), file types output by the activity serving as the base point (a list of file extensions), and attribute information output by the activity serving as the base point (for example, attribute name and attribute type (string, numeric, etc.)).

In step S1410, if an activity other than the activity serving as the base point is specified on the relationship chart, the attribute information on the partial flow serving as a path from the activity serving as the base point to the specified activity is displayed. The details of the operation in step S1410 are described with reference to a flowchart in FIG. 18.

If an activity other than the activity serving as the base point is specified on the relationship chart displayed on the display 187, the flow reference data that is the attribute information on the flow between the activity serving as the base point and the specified activity is displayed. The flow reference data is displayed in accordance with the following patterns:

Pattern 1

If an activity to the left of (placeable ahead of) the activity serving as the base point is specified, activity information on the path from the specified activity to the activity serving as the base point is retrieved from the DB 1315 in accordance with the relationship chart created in step S1406 and highlighted on the display 187. The following information related to the flow reference data is displayed on the display 187:

list of file types inputtable to the specified activity (for example, extensions), list of process contents from the specified activity to the activity serving as the base point (for example, names of activities), list of file types outputtable from the activity serving as the base point (for example, extensions), and list of attributes (attribute names and attribute types (string, numeric, etc.)) outputtable by all activities from the specified activity to the activity serving as the base point.

Pattern 2

If an activity to the right of (placeable behind) the activity serving as the base point is specified, activity information on the flow (the partial flow) from the activity serving as the base point to the specified activity is retrieved from the DB 1315 in accordance with the relationship chart created in step S1406 and highlighted on the display 187. The following information related to the flow reference data is displayed on the display 187:

list of file types inputtable to the activity serving as the base point (for example, extensions), list of process contents from the activity serving as the base point to the specified activity (for example, names of activities), list of file types outputtable from the specified activity (for example, extensions), and list of attributes (attribute names and attribute types (string, numeric, etc.) of all activities from the activity serving as the base point to the specified activity.

If multiple paths in the patterns 1 and 2 are present between the activity serving as the base point and the specified activity, the paths are highlighted on the display 187 while a path list, such as path 1, path 2, . . . , path N, is also displayed. The list may be arranged in the order of hither to lower frequency of uses.

The partial flow corresponding to the path selected in the path list by the user is retrieved from the DB 1315 in accordance with the relationship chart created in step S1406 and selectively highlighted while the flow reference data is also displayed on the display 187.

In step S1412, a partial flow is selected in response to user operation. The user may refer to the flow reference data displayed in step S1410 to find a desired partial flow. If the desired partial flow is found, the user may select a "confirm" button displayed in a right-click menu and proceeds to make the flow.

The partial flow, even once confirmed, may be canceled by selecting "cancel" displayed in the right-click menu.

In step S1414, the selected partial flow is registered as an activity. If the flow is confirmed in step S1412 and the flow to be registered is defined, the user may select a "register" button displayed in the right-click menu to register the flow on the DB 1315. For example, if an OK button is selected with name and description set on a flow registration screen, data on a flow registration information table 1600 is registered on the DB 1315. FIG. 16 illustrates the data structure of the flow registration information table 1600. The flow registration information table 1600 includes an activity ID column 1605, name column 1610, description column 1615, and flow data column 1620. The activity ID column 1605 stores an activity ID. The name column 1610 stores the name of the activity. The description column 1615 stores the description of the activity. The flow data column 1620 stores flow data.

The flow registration information table 1600 stores "GUID X" at the activity ID column 1605, "flow 1" at the name column 1610, "format conversion→document name conversion→image processing→character recognition operation ((format conversion→folder storage), (zip compression→→folder storage))" at the description column 1615, and "GUID 1, GUID 3, GUID 2, GUID 4 ((GUID 1, GUID 5), (GUID 7, GUID 5))" at the flow data column 1620.

In step S1416, the registered activity (the partial flow) is displayed on the activity list screen 300. Specifically, the flow registered in step S1414 is displayed on the activity list screen 300 and may be used in the same way as other activities.

It is determined in step S1418 whether the flow has been complete. If the flow has been complete, the process ends; otherwise, the process proceeds to step S1410.

Figure 17:
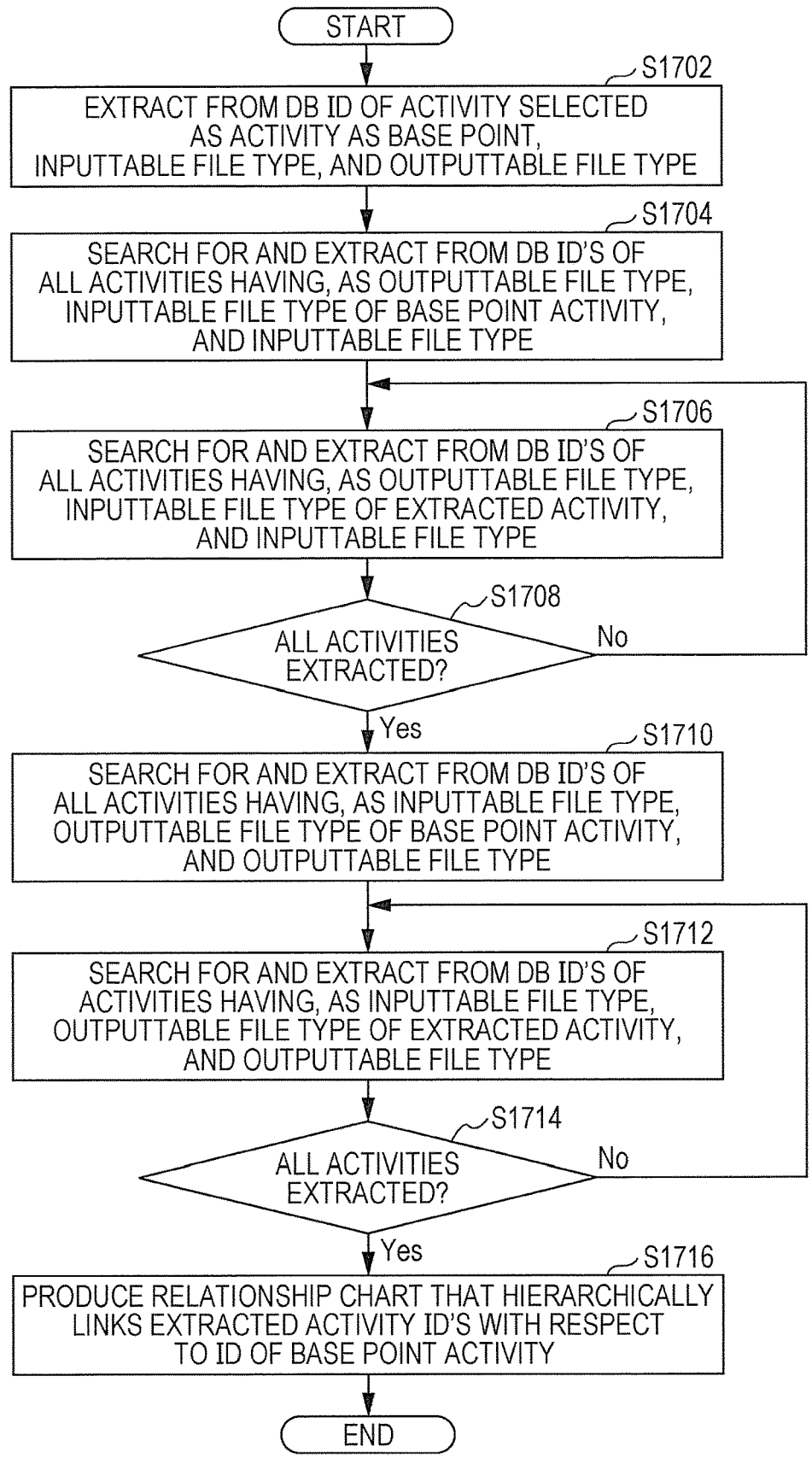
FIG. 17 is a flowchart illustrating a process example of the exemplary embodiment.

FIG. 17 is a flowchart illustrating a process example of the exemplary embodiment. The details of the operation in step S1406 of the flowchart in FIG. 14 are described herein.

In step S1702, the ID of the activity selected as the activity serving as the base point, the inputtable file type, and the outputtable file type are extracted from the DB 1315.

In step S1704, the IDs of all the activities having as the outputtable file type the inputtable file type of the activity serving as the base point, and the inputtable file type are searched for and extracted from the DB 1315.

In step S1706, the IDs of all the activities having as the outputtable file type the inputtable file type of the extracted activity, and the inputtable file type are searched for and extracted from the DB 1315.

In step S1708, it is determined whether all the activities are extracted. If all the activities are extracted, the process proceeds to step S1710; otherwise, the process returns to step S1706.

In step S1710, the IDs of all the activities having as the inputtable file type the outputtable file type of the activity serving as the base point, and the outputtable file type are searched for and extracted from the DB 1315.

In step S1712, the IDs of all the activities having as the inputtable file type the outputtable file type of the extracted activity, and the outputtable file type are searched for and extracted from the DB 1315.

In step S1714, it is determined whether all the activities are extracted. If all the activities are extracted, the process proceeds to step S1716; otherwise, the process returns to step S1712.

In step S1716, the relationship chart that hierarchically connects the extracted activity IDs ahead of and behind the ID of the activity serving as the base point is created and displayed on the display 187.

Figure 18:
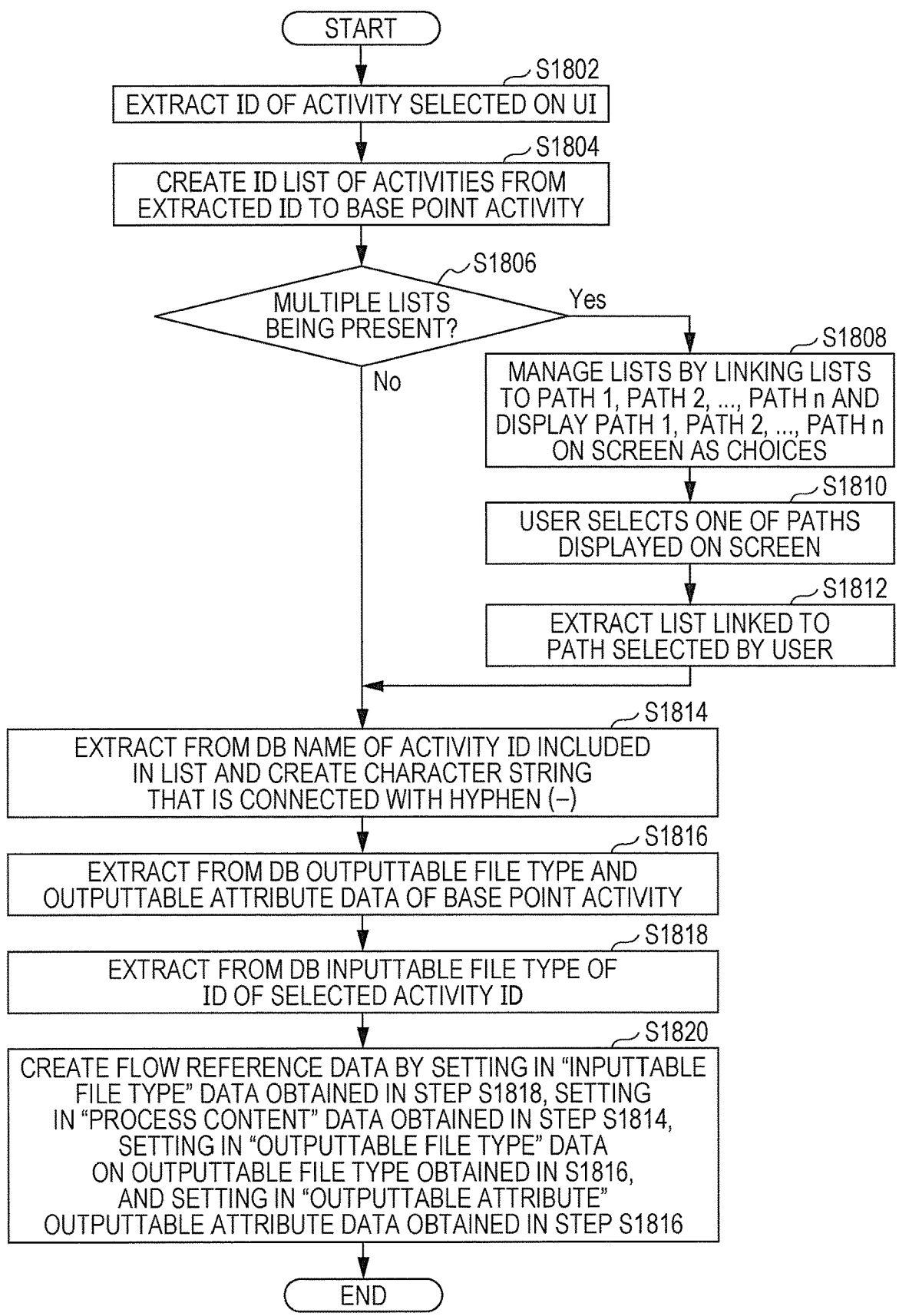
FIG. 18 is a flowchart illustrating a process example of the exemplary embodiment.

FIG. 18 is a flowchart illustrating a process example of the exemplary embodiment and thus illustrates the details of the operation in step S1410 in the flowchart in FIG. 14.

In step S1802, the ID of the activity selected on the UI of the display 187 is extracted.

In step S1804, an ID list of activities from the extracted activity ID to the activity serving as the base point is created.

In step S1806, it is determined whether multiple lists are present. If multiple lists are present, the process proceeds to step S1808; otherwise, the process proceeds to step S1814.

In step S1808, the lists are managed by linking the lists to character strings path 1, path 2, path n and path 1, path 2, . . . , path n are displayed as choices on the screen of the display 187.

In step S1810, one of the paths display on the screen of the display 187 is selected by the user.

In step S1812, a list associated with the path selected by the user is extracted.

In step S1814, the name of the activity ID included in the list is retrieved from the DB 1315 and a character string is created by concatenating the name with a hyphen.

In step S1816, the outputtable file type of the activity serving as the base point and the outputtable attribute data are extracted from the DB 1315.

In step S1818, the inputtable file type of the selected activity is extracted from the DB 1315.

In step S1820, the flow reference data is created by setting the data extracted in step S1818 in the inputtable file type, setting the data created in step S1814 in the process contents, setting the data on the outputtable file type extracted in step S1816 in the outputtable file type, and setting the outputtable attribute data extracted in step S1816 in an outputtable attribute. The flow reference data is then displayed on the display 187.

Figure 19:
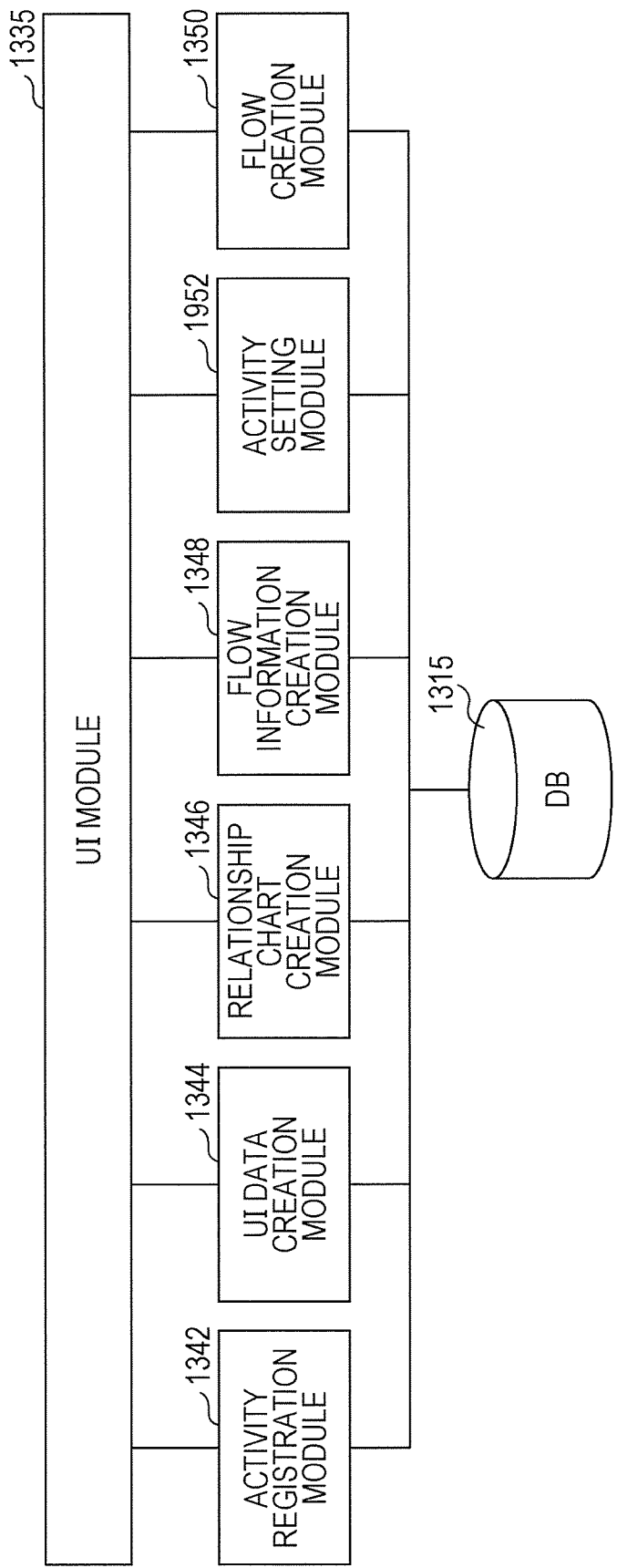
FIG. 19 illustrates a conceptual modular configuration of another specific example of the exemplary embodiment.

FIG. 19 illustrates a conceptual modular configuration of another specific example of the exemplary embodiment. The user interface (UI) module 1335 is a specific example of the UI module 135 in FIG. 1. Each of the activity registration module 1342, UI data creation module 1344, relationship chart creation module 1346, flow information creation module 1348, activity setting module 1952, and flow creation module 1350 is an example of the flow creation control module 140 in FIG. 1. The DB 1315 is an example of the data memory 115 in FIG. 1. Elements in FIG. 19 identical to those in FIG. 13 are designated with the same reference numerals and the discussion thereof is not repeated. The difference between the configuration in FIG. 19 and the configuration in FIG. 19 is that the configuration in FIG. 19 additionally includes the activity setting module 1952.

The DB 1315 is connected to the activity registration module 1342, UI data creation module 1344, relationship chart creation module 1346, flow information creation module 1348, activity setting module 1952, and flow creation module 1350.

The activity registration module 1342, UI data creation module 1344, relationship chart creation module 1346, flow information creation module 1348, activity setting module 1952, and flow creation module 1350 are connected to each of the DB 1315 and the UI module 1335.

The UI module 1335 is connected to the activity registration module 1342, UI data creation module 1344, relationship chart creation module 1346, flow information creation module 1348, activity setting module 1952, and flow creation module 1350.

The activity setting module 1952 customizes the registered activity and then registered the customized activity on the DB 1315. Specifically, the activity setting module 1952 modifies a process parameter that is an example of information on the specifications of the activity. The activity setting module 1952 may modify an activity that permits a process parameter therewithin to be modified from among the activities registered on the DB 1315. The UI screen may be set to be identical in layout to the activity attribute registration screen 400 in FIG. 4.

An additional process is described with reference to the flowchart in FIG. 14. If in step S1406 of the flowchart in FIG. 14, the activity setting module 1952 modifies a process parameter in each activity displayed on the display 187, the operation in step S1406 is performed again on the modification results, the relationship chart is re-created and re-displayed on the display 187.

When the relationship chart is created, the activity serving as the base point may be a folder output activity in step S1406 of in a "basic flowchart" in FIG. 14. Since the inputtable file type is "tiff, jpeg, bmp, png, pdf, or xdw", a "document name setting activity" and a "confidential box input activity" having the inputtable file type of "tiff, jpeg, bmp, png, pdf, or xdw" are extracted as an activity placeable ahead and displayed on the relationship chart. If the file type inputtable to the folder output activity is limited to "tiff or bmp" using the activity setting module 1952, only an "image processing activity" having the outputtable file type of "tiff or bmp" is extracted as the activity placeable ahead. For this reason, this leads to a change in the activities placeable ahead and the relationship chart is re-created and then re-displayed on the display 187. The same modification operation is applicable to the outputtable file type.

The same modification operation is applicable to not only the activity serving as the base point but also the attribute information on an activity displayed on the relationship chart.

Only a parameter modification may be permitted within a range where an activity to be operated remains appearing (a range where the activity to be operated remains connected with the activity serving as the base point). For example, with the relationship chart displayed on the display 187, "the inputtable file type" as the attribute information is modifiable in the document name setting activity and the confidential box input activity. But since the folder output activity as the activity serving as the base point is not connectable, the outputtable file type as the attribute information is not modifiable.

The activity to be operated may be designed to be hidden from the relationship chart by modifying the attribute information on the activity. For example, with the relationship chart displayed on the display 187, in the document name setting activity and the confidential box input activity, not only the inputtable file type as the attribute information is modifiable but also the outputtable file type as the attribute information is modifiable although the folder output activity as the activity serving as the base point is not connectable.

A user ID of a user who has registered is registered together when the partial flow is registered in step S1414 of the flowchart in FIG. 14. For example, a flow registration information table 2000 is registered. FIG. 20 illustrates a data structure of the flow registration information table 2000. The flow registration information table 2000 includes an activity ID column 2005, name column 2010, description column 2015, flow data column 2020, and registered person ID column 2025. The activity ID column 2005 stores the ID of an activity. The name column 2010 stores the name of the activity. The description column 2015 stores the description of the activity. The flow data column 2020 stores flow data. According to the exemplary embodiment, the registered person ID column 2025 stores information uniquely identifying a registered person (specifically, a registered person ID).

The first row of the flow registration information table 2000 stores "GUID X1" at the activity ID column 2005, "flow X1" at the name column 2010, "format conversion→document name conversion→image processing→character recognition operation ((format conversion→folder storage), (zip compression→→folder storage))" at the description column 2015, "GUID1, GUID3, GUID2, GUID4, ((GUID1, GUIDE), (GUID7, GUID5))" at the flow data column 2020, and "AAA" at the registered person ID column 2025.

The second row of the flow registration information table 2000 stores "GUID X2" at the activity ID column 2005, "flow X2" at the name column 2010, "format conversion→document name conversion→image processing→character recognition operation ((format conversion→folder storage), (zip compression→→folder storage))" at the description column 2015, "GUID1, GUID3, GUID2, GUID4, ((GUID1, GUID5), (GUID7, GUID5))" at the flow data column 2020, and "BBB" at the registered person ID column 2025.

The N-th row of the flow registration information table 2000 stores "GUID XN" at the activity ID column 2005, "flow XN" at the name column 2010, "format conversion→document name conversion→image processing→character recognition operation ((format conversion→folder storage), (zip compression→→folder storage))" at the description column 2015, "GUID1, GUID3, GUID2, GUID4, ((GUID1, GUID5), (GUID7, GUID5))" at the flow data column 2020, and "AAA" at the registered person ID column 2025.

When the relationship chart is displayed on the display 187 in step S1406 of the flowchart in FIG. 14, the flow registration information table 2000 may indicate that part of an activity ahead of the activity serving as the base point and an activity behind the activity serving as the base point is included in the flow data on a flow registered on the DB 1315. In such a case, an activity included in the partial flow of the flow is highlighted.

The highlighting is performed in a manner that distinguishes between part of the activity that is included in the flow created by the user and part of the activity included in the flow created by another user. For example, the display distinguishing may be performed by using different colors, attaching symbols, such as star symbols, changing fonts, changing the shape of drawings. Furthermore, a numerical value may be added to indicate the frequency of uses of the activity in cooperation.

To make the user to more easily notice and select a highlighted portion, an activity that has been used in cooperation more times (with a higher frequency of uses) is displayed closer to the activity serving as the base point and an activity that has been used in cooperation less times is displayed farther from the activity serving as the base point. Alternatively, activities included in a flow created by another user may be displayed on a lower half of the screen and activities included in a flow created by the user may be displayed on an upper half of the screen.

When the relationship chart is created in in step S1406 of the flowchart in FIG. 14, the flow data on the flow registered on the DB 1315 is referred to. The relationship of the activity serving as the base point in the relationship chart is determined based on the inputtable file type of the first activity and the outputtable file type of the last activity. The resulting flow is then introduced into the relationship chart and the relationship chart is displayed on the display 187.

The flow reference data may be displayed in step S1410 of the flowchart in FIG. 14. The outputtable attribute data is output in accordance with the flow data on the flow from the first activity to the last activity registered on the DB 1315. Based on outputtable attribute data, data for the flow reference data is introduced into the flow reference data and displayed on the display 187.

The flow registered in step S1404 of the flowchart in FIG. 14 may be selected. The flow data registered on the DB 1315 is referred to and an operation identical to the operation in step S1406 is performed in accordance with the inputtable file type of the first activity, the outputtable file type of the last activity, and the outputtable attribute data output from the first activity to the last activity. The relationship chart is thus created and displayed on the display 187.

When an activity is registered on the DB 1315 in step S1402 of the flowchart in FIG. 14, information used to determine whether the activity to be registered is an input source or an output destination is also registered together. For example, the types "input" and "output" are set in a type column 212 in an activity registration information table 2100. FIG. 21 illustrates a data structure of the activity registration information table 2100. The activity registration information table 2100 includes an activity ID column 2105, name column 2110, description column 2115, type column 2120, inputtable file type column 2125, outputtable file type column 2130, outputtable attribute data column 2135, and activity data column 2140. The activity ID column 2105 stores the ID of an activity. The name column 2110 stores the name of the activity. The description column 2115 stores the description of the activity. The type column 2120 stores the type of the activity. The inputtable file type column 2125 stores the inputtable file type. The outputtable file type column 2130 stores the outputtable file type. The outputtable attribute data column 2135 stores the outputtable attribute data. The activity data column 2140 stores activity data.

The first row of the activity registration information table 2100 stores "GUID 1" at the activity ID column 2105, "format conversion" at the name column 2110, "converting input image to specified format and outputting converted image" at the description column 2115, "(blank)" at the type column 2120, "tiff, jpeg, png" at the inputtable file type column 2125, "pdf, tiff, bmp, xdw" at the outputtable file type column 2130, "conversion format: character string, resolution: numerical value" at the outputtable attribute data column 2135, and "*****" at the activity data column 2140.

The second row of the activity registration information table 2100 stores "GUID 2" at the activity ID column 2105, "image processing" at the name column 2110, "rotating input image and outputting rotated image" at the description column 2115, "(blank)" at the type column 2120, "tiff, bmp" at the inputtable file type column 2125, "tiff, bmp" at the outputtable file type column 2130, "N/A" at the outputtable attribute data column 2135, and "*****" at the activity data column 2140.

The third row of the activity registration information table 2100 stores "GUID 3" at the activity ID column 2105, "document name setting" at the name column 2110, "changing name of input image file to specified name" at the description column 2115, "(blank)" at the type column 2120, "tiff, jpeg, bmp, png, pdf, xdw" at the inputtable file type column 2125, "tiff, jpeg, bmp, png, pdf, xdw" at the outputtable file type column 2130, "file name: character string" at the outputtable attribute data column 2135, and "*****" at the activity data column 2140.

The fourth row of the activity registration information table 2100 stores "GUID 4" at the activity ID column 2105, "character recognition operation, QR code analysis" at the name column 2110, "outputting results of character recognition of input image and results of analysis of QR code on input image" at the description column 2115, "(blank)" at the type column 2120, "pdf, tiff, bmp" at the inputtable file type column 2125, "pdf, tiff, bmp" at the outputtable file type column 2130, "character recognition results: character string, QR code analysis results: character string" at the outputtable attribute data column 2135, and "*****" at the activity data column 2140.

The fifth row of the activity registration information table 2100 stores "GUID 5" at the activity ID column 2105, "folder outputting" at the name column 2110, "storing image received in confidential box in predetermined folder" at the description column 2115, "output" at the type column 2120, "tiff, jpeg, bmp, png, pdf, xdw" at the inputtable file type column 2125, "N/A" at the outputtable file type column 2130, "file storage destination: character string" at the outputtable attribute data column 2135, and "*****" at the activity data column 2140.

The sixth row of the activity registration information table 2100 stores "GUID 6" at the activity ID column 2105, "confidential box inputting" at the name column 2110, "storing image received in confidential box in predetermined folder" at the description column 2115, "input" at the type column 2120, "N/A" at the inputtable file type column 2125, "tiff, jpeg, bmp, png, pdf, xdw" at the outputtable file type column 2130, "date of reception: date, received file name: character string" at the outputtable attribute data column 2135, and "*****" at the activity data column 2140.

The seventh row of the activity registration information table 2100 stores "GUID 7" at the activity ID column 2105, "fax input" at the name column 2110, "storing fax-received image in predetermined folder" at the description column 2115, "input" at the type column 2120, "N/A" at the inputtable file type column 2125, "tiff" at the outputtable file type column 2130, "date of transmission: date, transmitted file name: character string" at the outputtable attribute data column 2135, and "*****" at the activity data column 2140.

The eighth row of the activity registration information table 2100 stores "GUID 8" at the activity ID column 2105, "zip compression" at the name column 2110, "compressing input file in predetermined format" at the description column 2115, "(blank)" at the type column 2120, "not specified" at the inputtable file type column 2125, "zip" at the outputtable file type column 2130, "file name: character string" at the outputttable attribute data column 2135, and "*****" at the activity data column 2140.

The ninth row of the activity registration information table 2100 stores "GUID 9" at the activity ID column 2105, "mail transmission" at the name column 2110, "mail-transmitting input image to predetermined destination" at the description column 2115, "output" at the type column 2120, "not specified" at the inputtable file type column 2125, "N/A" at the outputtable file type column 2130, "destination: character string, sender: character string" at the outputttable attribute data column 2135, and "*****" at the activity data column 2140.

The N-th row of the activity registration information table 2100 stores "GUID N" at the activity ID column 2105, "GoogleDrive registration" at the name column 2110, "storing input image at predetermined location on GoogleDrive" at the description column 2115, "output" at the type column 2120, "not specified" at the inputtable file type column 2125, "file name: character string" at the outputttable attribute data column 2135, and "*****" at the activity data column 2140.

The following process is performed in accordance with the activity registration information table 2100. The relationship chart is created in step S1406 of the flowchart in FIG. 14. If the activity serving as the base point is an input, an activity as an output is extracted when the relationship chart is created and the list in FIG. 12B is displayed.

If the activity serving as the base point is an output, an activity as an input is extracted when the relationship chart is created. The list in FIG. 12C is displayed.

If the base point is neither an input nor an output, activities as the input and output are extracted when the relationship chart is created and the list in FIG. 12A is displayed.

When the list is displayed, a request to display the list may be included in the flow data that is to be displayed in step S1416 of the flowchart in FIG. 14. A determination may be made to determine the frequency of uses and the activities may be sorted and displayed in the order of a higher to lower frequency of uses. A determination may be made to determine whether the activity is included in the flow created by the user or in the flow created by another user on the DB 1315, the frequency of uses is determined and the activities are sorted in the order of a higher to lower frequency of uses.

If the user selects an item in each of the input list or output list, an operation identical to the operation in step S1410 of the flowchart in FIG. 14 is performed to create the path and the flow reference data as the attribute information on the path is displayed.

FIGS. 22A through 22C illustrate a process example of the exemplary embodiment. FIGS. 22A through 22C illustrate the details of the process example in FIGS. 8A and 8B. Specifically, the partial flow is registered and displayed in the same way as an activity.

Referring to FIG. 22A, a flow creation screen 2200 displays a partial flow 2210, activities 2212, 2214, confirmation menu 2220, and activity (path) attribute information display region. If a "confirm" key in the confirmation menu 2220 is selected, the confirmation menu 2220 transitions to the state in FIG. 22B1.

Referring to FIG. 22B1, the flow creation screen 2200 displays a complete flow 2230 and a registration menu 2240. If a "register" key is selected in the registration menu 2240, the flow creation screen 2200 transitions to a flow registration screen 2250 in FIG. 22B2.

The flow registration screen 2250 in FIG. 22B2 displays an activity ID column 2252, name column 2254, and description column 2256. The user enters a name to the name column 2254 and a description to the description column 2256.

Referring to FIG. 22C, in a way similar to an activity, a registered flow (namely, the complete flow 2230) is displayed as an activity (flow) 2272 within an activity list region 2270 of an activity list screen 2260. Also, in a way similar to an activity, the registered activity is operable.

FIGS. 23(a) through 23(c) illustrate a process example of the exemplary embodiment. Referring to FIG. 23(a), connectable multi-layered activities are referred to with respect to a selected activity 2350. Activities at a first front layer 2340 and a second front layer 2330 are displayed ahead of the activity 2350 and activities at a first back layer 2360 and a second back layer 2370 are displayed behind the activity 2350.

A display region in a flow creation screen 2300 looks like a window. If a zooming operation performed by the user is detected, only the front and back layers (the first front layer 2340 and the first back layer 2360) of the activity 2350 are displayed as illustrated in FIG. 23(b). If a high-angle view operation performed by the user is detected, further multiple layers are displayed as illustrated in FIG. 23(c). The flow creation screen 2300 thus displays the first front layer 2340 and second front layer 2330 ahead of the activity 2350 and the first back layer 2360, second back layer 2370, and third back layer 2380 behind the activity 2350. If a display region shifting operation performed by the user is detected, activities to the left of the activity 2350 are displayed for reference as illustrated in FIG. 23(d). In this example, the activities at the first front layer 2340, second front layer 2330, and third back layer 2320 ahead of the activity 2350 are displayed but the activities at the first back layer 2360 and the second back layer 2370 behind the activity 2350 are hidden accordingly. Naturally, in response to the user display shifting operation, activities not only on the left side but also activities on the right side, top side or bottom side are also displayed.

Figure 24B:
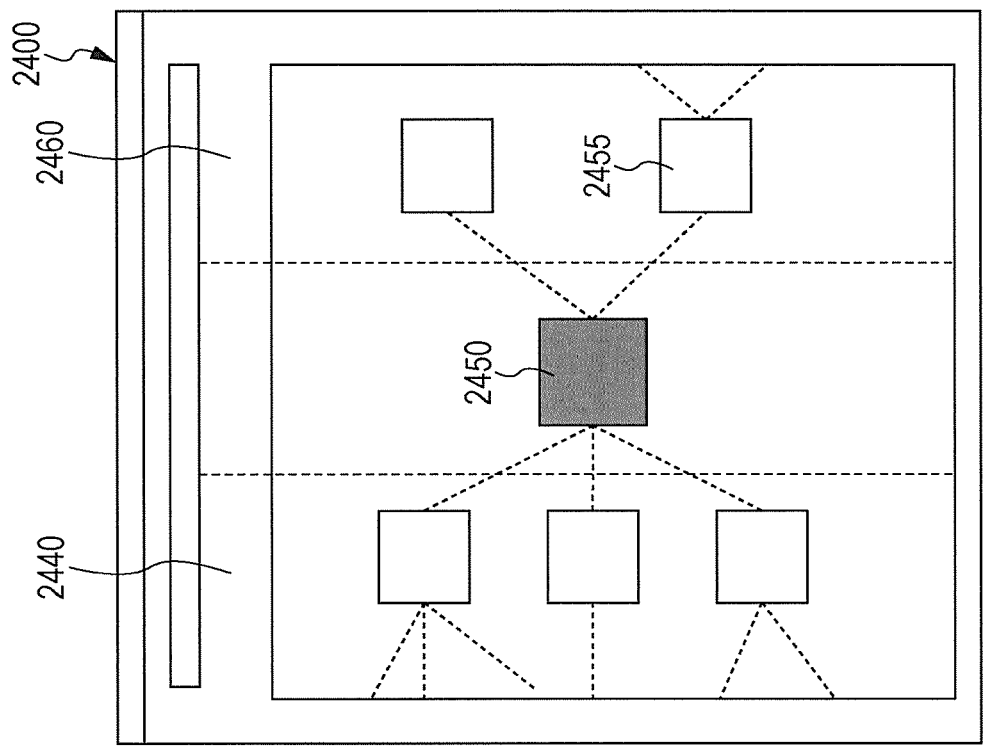
FIGS. 24A and 24B illustrate a process example of the exemplary embodiment.
Figure 24A:
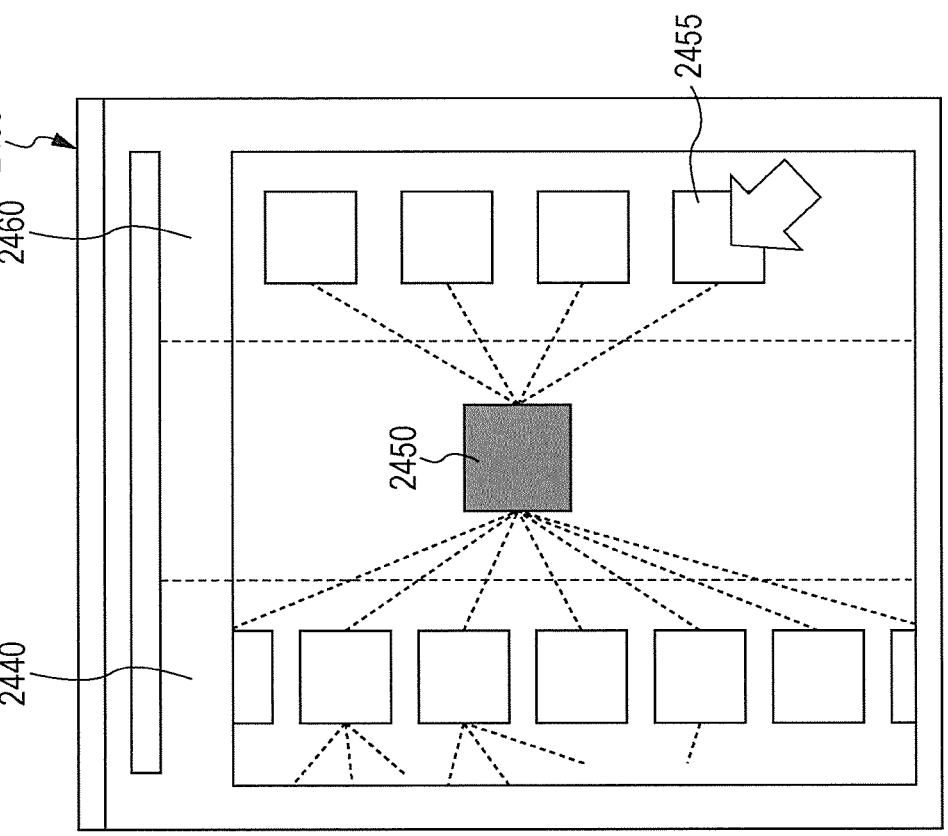

FIGS. 24A and 24B illustrate a process example of the exemplary embodiment. If one activity different from the activity serving as the base point is specified on the relationship chart displayed on the display 187, another activity including the specified one activity may be set to an activity serving as the base point, and the relationship chart is re-created and displayed on the display 187. Double-clicking on the one activity may serve the user specifying operation.

If an activity connected to the activity serving as the base point is specified on the display 187 in this way, activities connectable ahead of and behind the specified activity are displayed and an activity to be connected to the specified activity may be specified.

Specifically, if an activity 2455 is specified in the display screen in FIG. 24A in response to user operation, the display screen in FIG. 24B appears.

The display screen is limited to the activities connectable to an activity 2450, based on the assumption that the activity 2450 has been connected to the activity 2455. Specifically, seven or more activities are present at a first front layer 2440 in FIG. 24A but the number of activities is reduced to three in FIG. 24B. Referring to FIG. 24A, four activities are present at a first back layer 2460 in FIG. 24A, but the number of activities is reduced to two in FIG. 24B.

The program described above may be provided in the recorded form on a recording medium or via a communication medium. The program described above may be construed as a computer readable non-transitory recording medium storing the program.

The computer readable non-transitory recording medium refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the exemplary embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory storing specifications of components corresponding to functions forming a flow; and
a processor configured to perform control to extract, using the specifications of the components and a first component selected by a user and serving as a base point, a second component that performs a process prior to or subsequent to the first component and perform control to display the first component and the second component on a display,
wherein the processor is configured to perform control to display on the display a component other than the first component serving as the base point based on a frequency of uses,
wherein the frequency of uses includes a first frequency of uses in a flow that has been created by the user or a second frequency of uses in all flows that have been created, and
wherein the processor is configured to perform control to display the component on the display separately for the first frequency of uses and the second frequency of uses.

2. The information processing apparatus according to claim 1, wherein the processor is configured to
perform control to extract, after extracting the second component performing the process prior to the first component, a third component that performs a process prior to the second component and display the second component and the third component on the display, or
perform control to extract, after extracting the second component performing the process subsequent to the first component, the third component that performs a process subsequent to the second component and display the second component and the third component on the display.

3. The information processing apparatus according to claim 2, wherein the processor is configured to perform control to, in response to a component other than the first component serving as the base point being selected, extract a path from the selected component to the first component and display the path on the display.

4. The information processing apparatus according to claim 3, wherein the processor is configured to perform control to, in response to the displayed path being selected, undisplay a component displayed at a same layer as a component on the selected path.

5. The information processing apparatus according to claim 3, wherein the processor is configured to, when there are a plurality of paths from the selected component to the first component, perform control to display a list of the plurality of paths from which the user can make a selection.

6. The information processing apparatus according to claim 5, wherein the processor is configured to perform control to, in response to the user selecting a path from among the plurality of paths displayed on the display, display information on the selected path on the display.

7. The information processing apparatus according to claim 5, wherein the processor is configured to perform control to set the selected path to be selectable as a component and display the component and the path in different forms.

8. The information processing apparatus according to claim 1, wherein the processor is configured to perform control to, if information on the specifications of one component displayed on the display is modified, re-extract another component connected to the one component in accordance with the modified information and display the re-extracted component on the display.

9. The information processing apparatus according to claim 1, wherein the component having a higher frequency of uses is displayed closer to the first component.

10. The information processing apparatus according to claim 1, wherein the processor is configured to, when a plurality of components have a same second frequency of uses, perform control to display a component with a higher first frequency of uses in a larger size.

11. The information processing apparatus according to claim 9,
wherein the processor is configured to perform control to display a component at an n-th layer, if counted from the first component serving as the base point, in a size smaller than a component at an (n−1)-th layer.

12. The information processing apparatus according to claim 1, wherein the processor is configured to perform control to display a component at an n-th layer, if counted from the first component serving as the base point, in a size smaller than a component at an (n−1)-th layer.

13. The information processing apparatus according to claim 10, wherein the processor is configured to perform control to display a component at an n-th layer, if counted from the first component serving as the base point, in a size smaller than a component at an (n−1)-th layer.

14. The information processing apparatus according to claim 1, wherein the processor is configured to perform control to,
if the first component serving as the base point is an input source, extract the second component that performs the process subsequent to the first component and display the first component and the second component on the display,
if the first component serving as the base point is an output destination, extract the second component that performs the process prior to the first component and display the first component and the second component on the display, and
if the first component serving as the base point is neither the input source nor the output destination,
extract the second component that performs the processes prior to and subsequent to the first component and display the first component and the second component on the display.

15. An information processing apparatus comprising:
means for storing specifications of components corresponding to functions forming a flow;
means for performing control to extract, using the specifications of the components and a first component selected by a user and serving as a base point, a second component that performs a process prior to or subsequent to the first component and performing control to display the first component and the second component on a display;
means for performing control to display on the display a component other than the first component serving as the base point based on a frequency of uses,
wherein the frequency of uses includes a first frequency of uses in a flow that has been created by the user or a second frequency of uses in all flows that have been created; and
means for performing control to display the component on the display separately for the first frequency of uses and the second frequency of uses.

16. A non-transitory computer readable medium storing a program causing a computer to execute a process for processing information, the process comprising:
storing specifications of components corresponding to functions forming a flow;
extracting, using the specifications of the components and a first component selected by a user and serving as a base point, a second component that performs a process prior to or subsequent to the first component and displaying the first component and the second component on a display;
displaying on the display a component other than the first component serving as the base point based on a frequency of uses,
wherein the frequency of uses includes a first frequency of uses in a flow that has been created by the user or a second frequency of uses in all flows that have been created; and
displaying the component on the display separately for the first frequency of uses and the second frequency of uses.

* * * * *